Nov. 29, 1949  C. A. HAMPEL  2,489,571
CYCLIC PROCESS FOR PRODUCING PERCHLORATES AND
CHLORITES OF DIFFERENT METALS
Filed Feb. 13, 1946  9 Sheets-Sheet 9

INVENTOR
Clifford A. Hampel
BY
ATTORNEY

Patented Nov. 29, 1949

2,489,571

UNITED STATES PATENT OFFICE 2,489,571

CYCLIC PROCESS FOR PRODUCING PERCHLORATES AND CHLORITES OF DIFFERENT METALS

Clifford A. Hampel, Harvey, Ill., assignor to Cardox Corporation, Chicago, Ill., a corporation of Illinois Application February 13, 1946, Serial No. 647,396

24 Claims. (Cl. 23—85)

This invention relates to the production of perchlorate and chlorite salts, from (a) a combination of chlorates, or a chlorate and a salt, (b) a strong mineral acid and (c) a combination of alkaline compounds or an alkaline compound and a salt or salts in a halide-free medium. The perchlorate and chlorite salts formed may be those of the alkali metals, the alkaline earth metals and magnesium. The acids used may consist of strong mineral acids, except acids such as hydrochloric acid. The alkaline materials useful are oxides, hydroxides and carbonates. The metals of the chlorates, salts or alkaline materials used are of the same metal group mentioned above and upon their selection depends the particular perchlorate and the particular chlorite which are recovered.

In the past, many complicated processes have been devised for the preparation of both perchlorate and chlorite salts. It has been found, in accordance with this invention, that either or both of these products can be made with great efficiency in a simplified process using inexpensive and widely available raw materials.

The complete invention involves a cyclic operation in which the perchlorates and chlorites are obtained and in which certain intermediate products are recycled, but the invention also contemplates the operation of only a portion of the complete cyclic system, so that the intermediate products may be separately recovered. These intermediate products include chlorine dioxide and chlorates.

Figure 1:
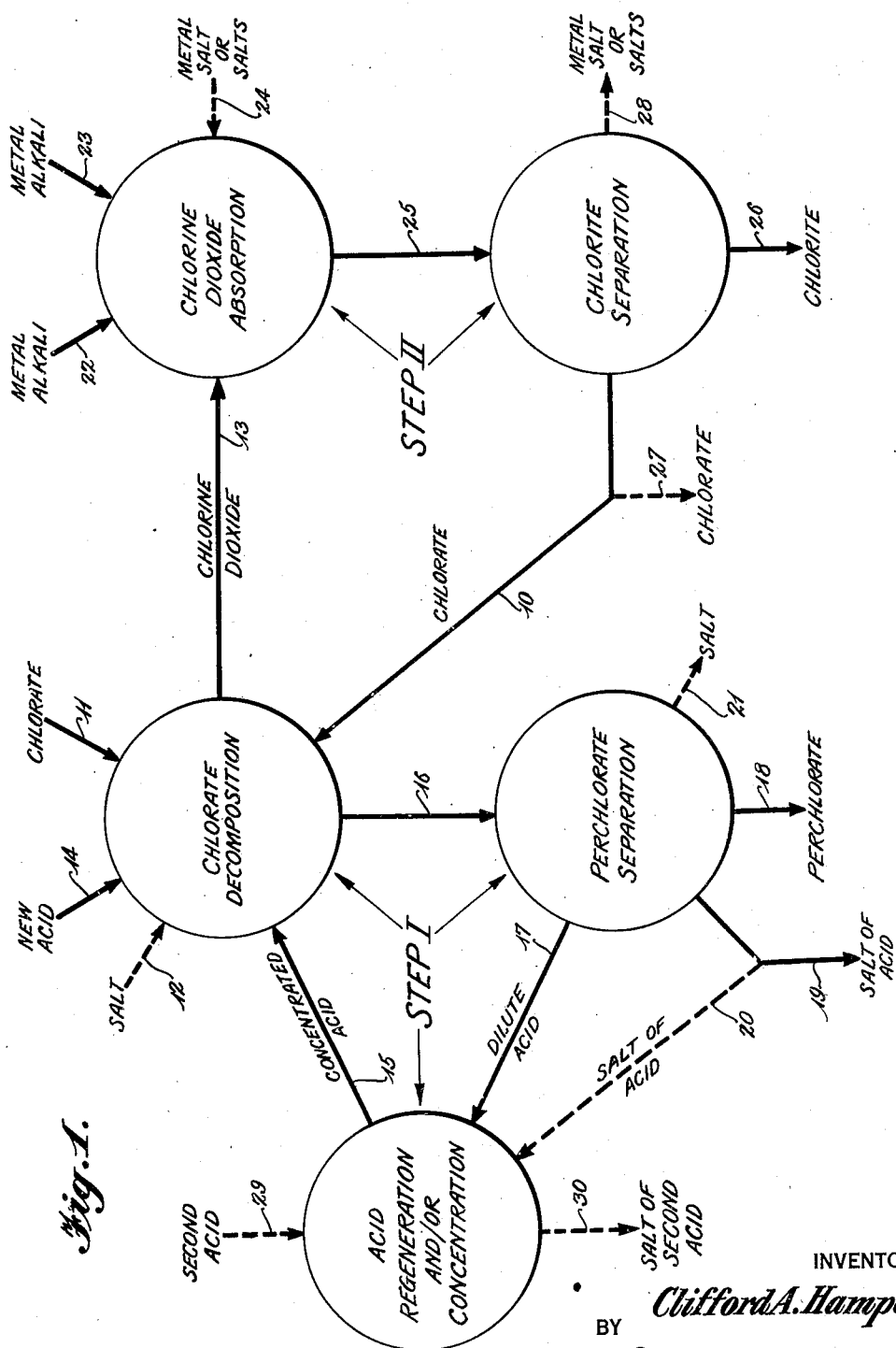

The invention can probably best be explained by reference to complete cyclic systems wherein both a perchlorate and a chlorite are formed, and this will be done first, it being understood, however, that portions thereof may be performed alone and such possibilities will be set forth later. These cyclic systems are illustrated in the accompanying drawings in which:

Figure 1 is a simplified flow diagram showing the general relationship between the steps of the cyclic process of the invention, and Figures 2 to 9 are flow diagrams employing specific compounds and specific steps to illustrate detailed cycles, according to the invention.

The production of perchlorates and chlorites by utilization of this invention consists essentially of two steps, and these may be explained with reference to Figure 1, in which the individual steps are indicated by Roman numerals. Step I involves decomposition of a chlorate by a strong mineral acid, whereby a perchlorate, a salt of the acid used, and chlorine dioxide are formed. It also involves recovery of this perchlorate which is formed by its separation from the other decomposition products of this step. Step I also involves recovery of the unreacted acid for return to the decomposition reaction and, optionally, conversion of a salt produced in this step I to its acid for return to the process. Step II involves absorption of the chlorine dioxide from step I by means of an alkaline material whereby a chlorate and a chlorite are formed. Step II also involves separation and recovery of the chlorate and chlorite which are produced in this step.

CHLORATE DECOMPOSITION

The chlorate decomposition is an oxidation-reduction reaction whereby some of the chlorate is oxidized to a perchlorate and the remainder of the chlorate is reduced to chlorine dioxide. This reaction is brought about in a chloride-free medium by a strong mineral acid or acids of the class comprising sulfuric acid, nitric acid, phosphoric acid, perchloric acid, fluosilicic acid and hydrofluoric acid. Also, a salt of this acid is produced, the metal of this salt being a metal which is introduced as a chlorate.

It is known that a single chlorate can be decomposed by a strong mineral acid, chiefly according to the following equation:

(a) $2H(Ac) + 3MClO_3 \rightarrow$
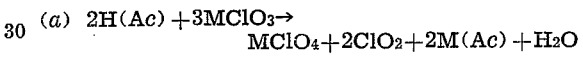
$MClO_4 + 2ClO_2 + 2M(Ac) + H_2O$ in which M represents a metal and (Ac) represents a mineral acid radical.

It will be observed that in this reaction (a), for every three moles of the chlorate so consumed, one mol of a perchlorate is formed, along with two moles of chlorine dioxide. Therefore, only one-third of the metal introduced as a chlorate appears as the metal of the perchlorate, the remaining two-thirds of the metal introduced as a chlorate appearing as the metal of the salt of the acid which is employed. It will be appreciated that if the metal employed as the chlorate is an expensive one, only one-third of it will be recovered in the form of the more valuable perchlorate, the other two-thirds appearing in the generally less valuable salt of the acid.

In accordance with the invention, a mole of the metal in the form of a perchlorate is recovered for every equivalent mole of that same metal which is introduced in a combined form into the reaction. Therefore, all of the metal ion introduced for the purpose of forming a perchlorate actually appears as a perchlorate and is not lost as the salt of the acid which is used. This result, in accordance with the invention, is accomplished by employing either two chlorates or one chlorate and another salt.

The reaction with two chlorates is represented by the following equation:

(b) $2H(Ac) + 2M^1ClO_3 + M^2ClO_3 \rightarrow$
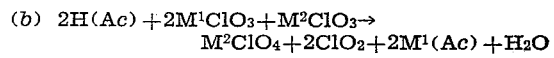
$M^2ClO_4 + 2ClO_2 + 2M^1(Ac) + H_2O$ in which $M^1$ represents a metal selected from the class consisting of lithium, potassium, sodium, strontium, calcium, barium and magnesium, $M^2$ represents another metal from this same group, and (Ac) represents a mineral acid radical other than one such as hydrochloric acid. The addition of these two chlorates is represented by lines 10 and 11 in Figure 1.

It will be noted that in Equation b, for every ion of the metal $M^2$ which is consumed as a chlorate, an ion of this same metal appears as a perchlorate in the final products. Therefore, none of this metal is lost by appearing in the final product as a salt of the acid. As a consequence, the metal $M^2$ may be a relatively expensive metal since all of it will be recovered as the more valuable perchlorate.

The reaction with a single chlorate and another salt may be represented by the following equation:

(c) $2H(Ac^1) + 3M^1ClO_3 + M^2(Ac^2) \rightarrow$
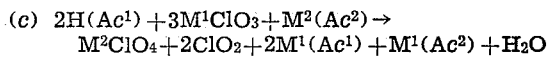
$M^2ClO_4 + 2ClO_2 + 2M^1(Ac^1) + M^1(Ac^2) + H_2O$ in which $M^1$ is a metal selected from the class consisting of lithium, potassium, sodium, strontium, calcium, barium and magnesium, $M^2$ is another metal selected from this same class, $(Ac^1)$ is the radical of a strong mineral acid other than one such as hydrochloric acid, and $(Ac^2)$ is the radical of the same or a different chloride-free mineral acid other than one such as hydrochloric acid. This addition of a salt is indicated by line 12 in Figure 1, and the chlorate may be that indicated either by line 10 or 11.

It will be observed from Equation c that all of the metallic ion of the metal $M^2$ which is introduced as a salt, appears as the metal of the perchlorate which is recovered. Therefore, as with the reaction of Equation b, this metal $M^2$ may be a relatively expensive one as all of it will be recovered in the more expensive perchlorate.

The order of addition of the reactants in Equations b and c is not of material importance. Thus, considering first the reaction represented by Equation b, the chlorates may be combined simultaneously with the acid, either by mixing them before combining the mixture and the acid, or by independently, but simultaneously reacting them with the acid. Or, the chlorates in Equation b may be successively combined with the acid, all of the one chlorate being combined first and after it has been completely decomposed, the other chlorate being combined with the acid. As another possibility, one of the chlorates may be combined with one portion of the acid and the other chlorate may be combined separately with another portion of the acid. After these chlorates have been decomposed in their respective acid baths, they may be combined into one bath, and this combination may be done either before or after a partial or complete separation of the solid products is carried out. The final products will be those represented by Equation b.

Referring to Equation c, the chlorate and the salt may be combined with the acid simultaneously by first premixing the chlorate and the salt or by combining them conjointly with the acid either separately or as a mixture. It is also possible to combine first the chlorate alone with the acid and after decomposition is completed, to add the salt. The metal of the salt added should be equivalent to one-third of the chlorate consumed.

The chlorates, or the chlorate and the salt, may be reacted either as solutions or in their solid forms. It is preferable that if they are reacted as solutions, they be in as strong a concentration as is possible so that the concentration of the acid will not be reduced more than necessary.

One of the chlorates in Equation b, or the chlorate in Equation c, may be derived from step II as will be hereinafter explained, and as is indicated by the line 10, in Figure 1, if the full advantages of a cyclic system are to be obtained. However, both chlorates may be fresh products, if desired.

It will be noted that in Equations b and c, chlorine dioxide gas is produced. This gas may be stored or used for any purpose. If the present complete cyclic system is practiced, this gas is utilized in step II, as will be explained and as is indicated by line 13, in Figure 1. To remove this gas as it is formed and convey it to a point of use, as for example step II, a gas which is inert with respect to the chlorine dioxide is constantly passed through the reaction chamber in which the chlorate decomposition is being carried out. This gas may be, for example, air or nitrogen.

The inert gas which is passed through the reaction chamber in which the chlorate decomposition is being carried out, also serves to dilute the concentration of the chlorine dioxide. This is important because if the chlorine dioxide reaches a moderately high concentration, an explosion may occur. It has been found advisable to supply a sufficient amount of the diluent gas so that the chlorine dioxide will not reach a concentration much higher than about 5% by volume.

Thus, there are two different metal ions present in the chlorate decomposition, one of which will be combined and separated as the perchlorate, and the other of which will end up as a salt which can either be marketed or can be converted to an acid for use in this reaction. If these two different metal ions are introduced as two chlorates, they should be present substantially in the ratio one to two on an equivalent basis, the metal which is to appear as the perchlorate being the metal which is introduced in the lesser amount as a chlorate. This relationship is important because, as has been pointed out, all of this metal appears in the perchlorate and none of it is lost by combination with the acid radical.

Because one of the three moles of chlorate reacted goes to perchlorate and the other two moles of chlorate reacted form chlorine dioxide, the equivalent ratio of the two metal ions used must be substantially one to two. The metal of the chlorate forming the chlorine dioxide ends up as a salt of the acid used, such metal salt being formed in quantities substantially equivalent to twice the amount of perchlorate formed.

If the two metal ions in step I are introduced one as a chlorate and the other as a salt, it will be usual that the metal ion of the salt will be the one which it is desired to appear as the metal ion of the perchlorate. Therefore, in this case, since only one-third of the metal ion introduced as a chlorate will appear in the form of the perchlorate, only one-third as much salt will be introduced relative to the chlorate on an equivalent basis, as this is all that will be necessary to furnish the metal ion of the perchlorate desired. The term "hydroxides" as used in the claims includes the introduction of oxides into the system, since the oxides of the foregoing metals form hydroxides in an aqueous medium.

The acid used in step I may be all fresh acid as is indicated by the line 14 in Figure 1, or part of it may be obtained by regeneration within the system, as represented by line 15, and as will be described. It is important that the acid be of high concentration and that there be an excess of acid over that required to stoichiometrically react with the chlorate. With a low acid concentration, the chlorate decomposition rate becomes so low as to be impractical. For example, if sulfuric acid is used, the reaction will nearly cease if the concentration is below 60%. As a consequence, there should be a sufficient initial excess of acid so that after all the added chlorate is consumed, the concentration of the acid will still be relatively high. As the reaction proceeds, considerable salt is precipitated and it may, therefore, be deemed advisable to effect a separation of these precipitated salts from the reaction mixture before the minimum concentration of acid is reached.

The action of the acid upon the chlorate to form chlorine dioxide and a perchlorate is not instantaneous. A considerable period of time must be allowed for the complete decomposition of the chlorate. For this reason, the preferred method of operation for the invention is to add the chlorate over a period of time so that the chlorine dioxide formation is continuous. The rate of chlorine dioxide formation is roughly proportional to the rate of addition of the chlorate to the acid. For this reason, the process may be conducted either as a batch process, or as a continuous process. In the latter case, the chlorate could be added continuously and in the desired ratio to the required amount of sulfuric acid in an appropriate continuously operating apparatus.

The temperature should be kept below about 70° C. Above this temperature, chlorine dioxide may begin to decompose thermally, although the decomposition temperature will vary with the concentration of the chlorine dioxide in the carrier gas, the lower the concentration, the higher the safe temperature limit. The reaction rate increases with increasing temperature, but above about 70° C. the reaction produces undesirable quantities of chlorine, the efficiency of chlorine dioxide generation being decreased thereby. The useful temperature range is from 0° C. to about 70° C., the rate being about four times as great at 60° C. as it is at 25° C.

Representative acids which may be used are sulfuric acid, perchloric acid, nitric acid, phosphoric acid, fluosilicic acid and hydrofluoric acid, and the minimum concentration to obtain effective results with the particular chlorate or chlorates to be decomposed in step I may be readily determined. The lowest effective concentration varies with the temperature and consequently with higher temperature, it is possible to use lower concentrations.

Certain limitations must be observed in choosing the two metal ions which are introduced in step I, and also in choosing the acid used if a definite perchlorate is desired. For example, to form a perchlorate of any of the alkaline earth metals, the acid used in the chlorate decomposition step I should not be sulfuric acid, phosphoric acid or fluosilicic acid. Nitric acid or perchloric acid may be used with any mixture of metal ions. If the perchlorate of lithium, sodium and magnesium is desired, any of the above acids may be used. In this latter case, however, if one of the metals present is potassium, it will separate out as potassium perchlorate and this will be true for all instances in which potassium is one of the metals entering the separation step. The selection of the best combination of acid and the metal ions to obtain a desired perchlorate can be made on the basis of a few simple preliminary tests utilizing the limitations just discussed.

It will be appreciated that a mixture of perchlorates, for example, rather than a single perchlorate, could be produced by this invention by the introduction of a mixture of metal ions to be equivalent to one-third of the chlorate decomposed on an equivalent basis. For example, a mixture of perchlorates can be obtained by the reaction exemplified by the following equation:

(d) 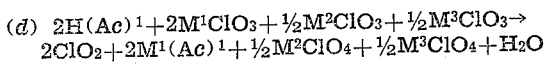

The three salt products being separated from the excess acid may be treated with sufficient water to dissolve the two perchlorates, leaving the solid salt of the acid. The solution of the two perchlorates can then be evaporated to yield a mixture of equivalent amounts of perchlorates.

In the operation of the invention according to the process exemplified by Equation c, wherein one of the metal ions is introduced as a salt of that metal, the anion of the metal salt may be the same as the acid radical of the acid used or it may be different from the acid radical. If it is the same as the acid radical, for example, a sulfate salt added to sulfuric acid, it is obvious that the salt of the acid formed by the reaction will be the same as the salt derived from the salt added to the reaction along with the chlorate. If said anion be different from the acid radical used, for example, a nitrate salt in conjunction with sulfuric acid, two salts other than the perchlorate will be found in the finished mixture. Practical operating conditions and requirements, as well as economic considerations will largely dictate the choice of the salt used to introduce one of the metal ions for this process.

It should be pointed out that it is possible to use a mixture of strong acids for the operation of the invention quite satisfactorily. In some cases, the use of mixed acids will make economies of operation possible. This is especially true if perchloric acid be one of the mixed acids, the perchlorate of the one metal added to the system being recovered substantially all in the form of the desired perchlorate, while the other metal added to the system appears as the salt of the other one of the mixed acids. For example, if a mixture of sulfuric and nitric acids, commonly known as the "nitrating acid," is used, a metal sulfate and a metal nitrate may be recoverable from the other metal perchlorate. The nitrate and the sulfate can be processed, separated and sold individually, or it may be desirable to regenerate nitric acid from the nitrate salt by proper treatment with sulfuric acid, making it possible to recycle the nitrate acid while only fresh sulfuric acid need be added to the operation for replacement purposes.

Another suitable acid mixture would be that of perchloric and sulfuric acids. Depending upon the acids used and the exact conditions of operation, salts of each of the acids used might be formed, rather than the single salt which would result from the use of a single acid. However, since strong sulfuric acid reacts with sodium nitrate to form nitric acid and sodium acid sulfate, it is doubtful, in case a nitric-sulfuric acid mixture were used in the chlorate decomposition, that any sodium nitrate would be precipitated from the products.

PERCHLORATE SEPARATION

All of the end products from the chlorate decomposition reaction, after substantially all of the chlorine dioxide has been stripped out, are transferred to the perchlorate separation operation, as is indicated by line 16 in Figure 1. In this separation the perchlorate which is formed as a result of the chlorate decomposition is separated from the other products. This separation may first involve the removal of the excess or unreacted acid from the solid products. This may be accomplished by ordinary filtration or by the use of centrifugal force. The unreacted acid which is recovered in this manner is delivered to the regeneration and/or concentration operation, as is indicated by the line 17 in Figure 1, where it may be concentrated to the necessary strength for it to be returned to step I. Line 15 in Figure 1 indicates this return of concentrated acid to the chlorate decomposition operation. This concentration may, for example, be accomplished by evaporating off some water.

In this separation step, the perchlorate is separated by any convenient means from the salt which is formed with the acid radical. For example, sufficient water may be added to bring in solution all of the more soluble one of these products. Thus, if the salt of the acid is the most soluble, sufficient water would be added to bring it all into solution so that the perchlorate would largely remain as a solid. The perchlorate is then separated from this water solution of the salt by simple filtration or centrifuging and is removed, as is indicated by line 18 in Figure 1. The perchlorate may then be further washed and dried for sale.

In procedures in which potassium is one of the metals introduced into the system, it will appear principally as potassium perchlorate from step I. As it is quite insoluble, it may be separated in step II from the salt of the acid. However, the acid salt which is formed may be more insoluble than the perchlorate.

Thus, if the metals introduced are sodium and barium, the barium sulfate which is formed is more insoluble than the sodium perchlorate which is formed, and the sodium perchlorate will consequently appear in the filtrate. It will be understood that the barium and sodium may both be introduced as chlorates, or one may be introduced as a chlorate and the other as a salt. In any instance in which the two metals are selected from the above group and introduced either as chlorates or as one chlorate and one salt, the question of whether the perchlorate or the acid salt is the most insoluble is readily determinable.

The salt which is separated, as is indicated by line 19, may be either sold as a salt or it may be delivered to the acid regeneration operation, as is indicated by line 20, in Figure 1. In this latter case, this salt may be treated with an acid to convert it to the acid which is used in the chlorate decomposition. The reaction involved may be represented by the following equation:

(e) $M(Ac^1) + H(Ac^2) \rightarrow H(Ac^1) + M(Ac^2)$

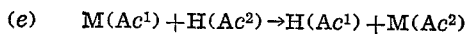

in which $Ac^1$ is the acid radical of the acid used in the decomposition of step I, and $Ac^2$ is the acid radical of the acid used to regenerate the decomposition acid. If this regeneration of the decomposition acid is carried out, it is possible to employ a relatively expensive acid as the decomposition acid and to employ a relatively inexpensive acid to carry out the regeneration of Equation e.

The salt product which is formed from the decomposition acid may be obtained in step I by direct filtration or centrifuging if it is more insoluble than the perchlorate. However, if it is more soluble than the perchlorate and is brought into solution by the addition of more water so that the perchlorate can be recovered by filtration, as explained above, this salt may be obtained from the solution by ordinary concentration. If this salt is recovered, for example, by crystallization, the mother liquor may be returned to the acid regeneration step for reconcentration for ultimate delivery to the chlorate decomposition reactor.

If the salt product which is formed in the decomposition operation with the acid used for carrying out the decomposition is to be sold as a salt and is not to be regenerated as an acid for use in the decomposition operation, additional fresh acid must be added in a quantity equivalent to the salt of this acid which is removed at 19 in Figure 1.

It has been explained that in the decomposition operation, a chlorate and a salt may be employed instead of two chlorates. The acid radical of this salt will appear in the salt represented by $M^1(Ac^2)$ in Equation c, and this latter salt will be removed from the system by physical means, as is indicated at 21.

It is recognized that a commercially valuable perchlorate product would be produced if the perchlorate were left associated with part of or all of the salt of the acid simultaneously formed. If such a product is desired, the only separation which need be made is that of removing the final salt products, including the perchlorate, from the excess acid. To exemplify the above noted innovation to the processes represented by Equations b and c, it is possible to prepare a mixture of sodium perchlorate and calcium sulfate, for example, by decomposing a mixture of one mole of sodium chlorate and one mole of calcium chlorate by the use of sulfuric acid. After the excess sulfuric acid has been removed, a mixed product containing substantially equal moles of calcium sulfate and sodium perchlorate can be recovered by drying the separated mixture.

CHLORINE DIOXIDE ABSORPTION

In this operation in step II, chlorine dioxide is reacted with an alkaline material in an aqueous medium. It will be understood that this chlorine dioxide will come from step I, as indicated by the line 13, in the case of a cyclic system, but that any other source of chlorine dioxide may be used as well. As a result of this reaction, a chlorate and a chlorite are formed.

It is known that chlorine dioxide may be reacted in aqueous medium with a single alkali, according to the following equation:

(f) $2ClO_2 + 2MOH \rightarrow MClO_3 + MClO_2 + H_2O$

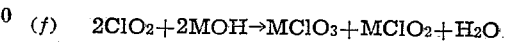

M being any suitable metal. While a hydroxide is indicated in the above equation any alkali as hydroxides, oxides and carbonates in equivalent quantities will yield the same chlorine compounds, and although the use of the hydroxide is indicated here and in the following discussion and equations, it will be understood that oxides and carbonates are likewise useful as alkaline materials and are included in the term "alkalis" (cf. Hackh's Chemical Dictionary, 3rd edition, p. 31; Webster's New International Dictionary, second edition, p. 66).

It will be observed that in this reaction (f), for every equivalent of the alkali which is reacted, one-half equivalent of a chlorite and one-half equivalent of a chlorate are formed. Therefore, one-half of the metal introduced as an alkali appears as the metal of the chlorate, the remaining one-half of the metal introduced as an alkali appearing as the chlorate. Consequently, the chlorite and the chlorate are produced as salts of the same metal.

In accordance with the invention, the chlorite of one metal and the chlorate of another metal are formed. This result is accomplished in accordance with the invention by employing either two different metal alkalis in equivalent amounts, or one metal alkali and the salt or salts (other than an alkali) of one or more other metals in a ratio of two to one on the equivalent basis.

The reaction between the two alkalis and chlorine dioxide is represented by the following equation:

(g) $2ClO_2 + M^3OH + M^4OH \rightarrow M^4ClO_3 + M^3ClO_2 + H_2O$ in which $M^3$ represents a metal selected from the class consisting of lithium, potassium, sodium, strontium, calcium, barium and magnesium; $M^4$ represents a different metal from this same group, and OH being indicative of either the same or different alkali radicals selected from the class consisting of oxides, hydroxides and carbonates. The addition of these two alkalis to step II is indicated by lines 22 and 23 of Figure 1.

In Equation g it will be observed that all of one metal introduced as an ion of an alkali appears as the chlorate and all of the other metal introduced as an ion of an alkali appears as the chlorite. Therefore, by properly selecting these two metals, substantially all of the one metal may be recovered in the form of a chlorite and substantially all of the other metal may be recovered in the form of a chlorate.

The reaction with a single alkali and a salt (other than an alkali) may be represented by the following equations:

(h) $2ClO_2 + 2M^3OH + M^4Ac \rightarrow M^3ClO_3 + M^4ClO_2 + M^3Ac + H_2O$ (i) $2ClO_2 + 2M^3OH + M^4Ac \rightarrow M^4ClO_3 + M^3ClO_2 + M^3Ac + H_2O$ in which $M^3$ is a metal selected from the class consisting of lithium, postassium, sodium, strotium, calcium, barium and magnesium; $M^4$ is another metal selected from this same class; Ac is the radical of a mineral acid. The radical OH represents an alkali selected from the class consisting of oxides, hydroxides and carbonates. The alkali employed may be one of those indicated at 22 and 23 and the addition of the salt is indicated at 24.

In Equation h the metal of the salt ends up as the chlorite salt, and in Equation i the metal of the salt ends up as the chlorate salt. In both cases, it is to be noted that one equivalent of the metal of the salt is consumed for every two equivalents of the metal of the alkali. Thus, for every equivalent of chlorine dioxide reacted, an equivalent quantity of the metal alkali is consumed. In all cases, sufficient alkaline compound must therefore, be provided in step II to effect the absorption of all of the chlorine dioxide, whichever mode of absorption is utilized. For example, if sodium hydroxide and potassium chloride are the sources of the two metal ions for the formation of one mole of chlorite, and one mole of chlorate from the absorption of the two moles of chlorine dioxide, two moles of sodium hydroxide and one mole of potassium chloride must be used.

From the peculiarities noted above in connection with the process exemplified by Equations h and i, it will be appreciated that the single alkali and the salt that are employed must be so selected that the cation of the alkali, when combined with the anion of the salt, forms a third compound that is of relatively different solubility than the specific chlorate and chlorite selected for production, under the conditions existing in this system. Additionally, when certain chlorates and chlorites are desired to be produced simultaneously, this process exemplified by Equations h and i offers marked advantages over that set forth in Equation g. For example, when it is desired to produce potassium chlorate and calcium chlorite, the employment of calcium hydroxide and potassium sulfate would entail about one-fourth the present raw material cost of employing corresponding (equivalent) quantities of potassium hydroxide and calcium hydroxide.

It is also possible, in carrying out this invention, to employ two salts (other than alkalis) along with the alkali in the chlorine dioxide absorption step. This is represented by the equation:

(j) $2ClO_2 + 2M^3OH + M^4(Ac^1) + M^5(Ac^2) \rightarrow M^4ClO_3 + M^5ClO_2 + M^3(Ac^1) + M^3(Ac^2) + H_2O$ in which $M^3$, $M^4$, and $M^5$ are different metals selected from the class consisting of lithium, potassium, sodium, strontium, calcium, barium and magnesium, and $(Ac^1)$ and $(Ac^2)$ are the same or different acid radicals of the mineral acids. The radical OH represents an alkali selected from the class consisting of oxides, hydroxides and carbonates.

This variation expressed by Equation j is advantageous as it makes it possible to employ an inexpensive alkali and inexpensive salts (other than alkalis). For example, the alkali may be calcium hydroxide and the salts (other than alkalis) may be potassium sulfate and sodium sulfate to form calcium sulfate, potassium chlorate and sodium chlorite.

It may be pointed out here that the salt or one of the salts to be utilized in the reactions represented by Equations h, i, and j may be one of the products, or a portion of one of the products of step I. That is, a salt to be added as represented by the line 24 in Figure 1 may be the same salt which is represented by line 19 in Figure 1 as having been formed in step I. This salt may be, for example, sodium sulfate. The term "salt," as used herein, thus does not include the alkalis.

It further will be noted that in this Equation j, the singe alkali and the salts that are employed may be so selected that the cation of the alkali, when combined with the anions of the salts forms a third compound that is of relatively different solubility than the chlorate and the chlorite selected for production, under the conditions existing in this system. Additionally, when certain chlorates and chlorites are desired to be produced simultaneously, the process exemplified by Equation $j$ offers marked advantages over that exemplified by Equation $g$. For example, when it is desired to produce potassium chlorate and sodium chlorite, the employment of calcium hydroxide, potassium sulfate and sodium sulfate would entail about one-half the present raw material cost of employing corresponding (equivalent) quantities of potassium hydroxide and sodium hydroxide.

It is of advantage that the third compound formed as described above in the reactions exemplified by Equations $h$, $i$ and $j$ be appreciably less soluble than either the chlorate and/or the chlorite produced. In this case, it can be substantially completely removed from the system to leave remaining only a mixture of the chlorate and chlorite. For example, if an alkali of one of the alkaline earth metals is employed as the alkali, suitable metal salts, used to introduce the metal or metals of the chlorate and chlorite, would include such salts as the sulfate, fluoride, phosphate, silicate, fluosilicate and arsenate. Further, if a magnesium alkali is employed as the source of the base, suitable metal salts, used to introduce the metal or metals of the chlorate and chlorite, would include such salts as the fluoride, phosphate, silicate and arsenate.

Although it has been pointed out above that the third compound formed under the reactions exemplified by Equations $h$, $i$ and $j$ should be such that its solubility differs from the solubility of the chlorate and chlorite to facilitate ready separation of this third compound from the other components of the system, it is recognized that a commercially valuable chlorate or chlorite product would be produced, if the aforementioned third compound were left associated with either the chlorate or the chlorite. When this is the case, the metal of the base and the anion of the salt or salts selected need only be such that the third compound is selectively soluble with reference to only one of the major products, namely, the chlorate or the chlorite.

To exemplify the above noted innovation to the processes represented by Equations $h$, $i$ and $j$, it is possible to use alkali metal compounds as well as the alkaline earth metal and magnesium compounds, and also to use such additional salts as the chlorides and nitrates to introduce the metals of the chlorate and the chlorite. An example illustrating this mode of operation is that of the production of a mixture of potassium chlorate, sodium chlorite and sodium sulfate.

The potassium chlorate content of this mixture can be substantially removed by evaporation and crystallization to leave an essentially equivalent mixture of sodium chlorite and sodium sulfate. These later two compounds can be recovered together to yield a sodium chlorite product containing sodium sulfate as a diluent.

It will be appreciated that a mixture of chlorites, for example, rather than a single chlorite, could be produced by this invention simply by the use of two or more alkaline compounds, or by the use of one alkaline compound and the salts of two or more metals. In this way, the necessary metals for the formation of the mixture of chlorites are introduced.

The salt used to introduce the second metal ion should be one which does not decompose chlorites under the reaction condition. For example, acid salts such as potassium acid sulfate ($KHSO_4$) and potassium acid phosphate ($KH_2PO_4$), if added in the absence of free base would decompose chlorites if a sufficiently low pH were reached.

Since potassium chlorate is the least soluble of the salts comprising the class of the chlorites and chlorates of lithium, potassium, sodium, strontium, calcium, barium and magnesium, if potassium be one of the metals introduced into step II, it will be recovered as the chlorate to the extent that it is equivalent to the chlorate produced in step II. Therefore, if it be desired to prepare a chlorate other than potassium chlorate in step II, no potassium ion should be used in this operation.

The order of the addition of the reactants in Equations $g$, $h$, $i$ and $j$ is not of material importance. Thus, considering first the reaction represented by Equation $g$, the alkalis may be mixed together when the chlorine dioxide is delivered to them. Or, the chlorine dioxide may be passed through one of these alkalis until neutralization is effected and then the other alkali may be added and the chlorine dioxide continued to be supplied until neutralization is again reached. It is also possible to deliver the chlorine dioxide to separate alkalis and after they have each been neutralized to combine them. After these neutralized alkalis have been mixed, the final products will be those represented by Equation $g$. In this mode of operation, a partial separation of the salts formed may be made in either or both portions before the final mixing is done.

Referring to Equations $h$, $i$ and $j$, the alkali and salt or salts may be present together when the chlorine dioxide is being delivered thereto, or the salt or salts may be added after neutralization of the alkali is accomplished.

Ordinarily, the chlorine dioxide gas will be delivered to the alkali by passing the gas through a water solution of the alkali. It will be appreciated that the chlorine dioxide may be delivered simultaneously to several different alkali baths or that it may be passed to baths connected in series so that there will always be a relatively fresh bath in the system to make sure that all of the chlorine dioxide is absorbed. The chlorine dioxide is, of course, delivered until the alkali is all neutralized.

It will be appreciated from Equations $g$, $h$, $i$ and $j$ that every mole of chlorine dioxide which is reacted forms one-half mole of the chlorate of one metal and one-half mole of the chlorite of another metal introduced in step II. As has been stated, these two metals should be supplied in equal amounts on an equivalent basis and, therefore, equivalent amounts of the chlorate and chlorite will be formed with no loss of either metal.

The useful temperature range is from 0° C. to 100° C., the preferred upper limit being about 70° C. Ordinarily, this reaction will be carried out at room temperature. A definite concentration of the mixed alkaline materials in step II is not essential to carry out the reaction. Chlorine dioxide will be absorbed by almost any concentration of the mixed alkaline compounds. A suitable initial concentration is approximately 15% by weight.

CHLORITE-CHLORATE SEPARATION

The products formed in the absorption reaction of step II are delivered to the separation operation, as is indicated by the line 25, for separation and removal of these products. The chlorite and chlorate are separated from each other by physical means as extraction, concentration, washing, cooling, filtration or centrifuging. The chlorite recovered is removed, as is indicated at 26, and may be used in this condition, or it may be washed and dried for use or sale. In some cases, the chlorate salt will be selectively separated from the chlorite salt, due to the lower solubility of the chlorite. In other cases, the chlorite salt will be selectively separated from the chlorate salt, due to the lower solubility of the chlorate.

If step II involves the use of a salt, as is represented by the Equations *h, i* and *j,* the salt which is formed therefrom is removed in the separation of step II in any suitable manner and this removal is indicated by the line 28 in Figure 1.

The chlorate which is produced in step II, if it is one of the chlorates which may be used in step I, may be delivered from step II to step I, as indicated at 10. All that is required in this instance is that one of the metal ions which is desired in step I appear from step II as the chlorate so that this chlorate may be utilized in step I. Or, the chlorate which is formed may be removed for other uses, as for sale, as is indicated at 27 in Figure 1.

ACID REGENERATION AND/OR CONCENTRATION

It has been pointed out that in the chlorate decomposition of step I an excess of the decomposition acid is employed, and that in the separation of the products formed this remaining excess acid is recovered. It can be discarded or put to any use, or delivered to the concentration or regeneration operation, as indicated by line 17. In this operation, this acid is reconcentrated by removal of water, as by evaporation, for return to the chlorate decomposition reaction as a part of the acid there required, as is indicated by line 15.

Also, the salt of this decomposition acid, which is formed and isolated in step I may be delivered to the regeneration operation, as is indicated by line 20. In this mode of operating, this salt is treated with an acid which will convert it to the acid used for decomposition of the chlorate or chlorates. The addition of this second acid is indicated at 29 in Figure 1, and the salt of this second acid, which is formed as a result of this regeneration, is indicated at 30.

This regeneration of the salt of the decomposition acid is represented by Equation *e*. For example, if perchloric acid is used for the decomposition in step I, its salt which is formed from the acid employed and then recovered may be reconverted to perchloric acid by treatment with hydrochloric acid.

It will be apparent that the acid recovered from this regeneration operation need not be returned to step I, but may be put to any other desired use. Thus, all of the acid used in step I may be fresh acid.

It should be pointed out that perchloric acid, when used in the operation of the invention, to some degree varies the operational details. This arises from the fact that the perchlorate ion in the acid is a common ion with the perchlorate formed as a product of the reaction. In other words, instead of obtaining one metal perchlorate, two metal perchlorates are formed. One of the metal perchlorates appears as one equivalent, as the reactions exemplified by Equations *b* and *c;* while the other perchlorate appears as the two equivalents of the salt of the acid.

Since perchloric acid is a relatively expensive acid, in most cases economy of operation will be achieved if the two equivalents of the one metal perchlorate are converted into perchloric acid for reuse in the acidification process by the use of some cheaper acid, such as sulfuric or hydrochloric acid. By thus regenerating perchloric acid from two of the three equivalents of perchlorate salt formed by the process, the operation of the invention becomes truly cyclic. Two equivalents of perchloric acid are required for the chlorate decomposition and two equivalents of perchlorate salt are reconverted to perchloric acid. This arises from the fact that of the three equivalents of perchlorate ion found in the final completed reaction mixture, only one is created by the chlorate decomposition, the other two being derived from the perchloric acid itself. Instead of regenerating perchloric acid by the addition of hydrochloric acid, sulfuric acid might be used, and instead of distilling the perchloric acid away from the sulfuric acid residual, the residual mixture of sulfuric and perchloric acids could go back into the reaction vessel.

It would be possible, of course, to sell or use elsewhere both of the metal perchlorates formed by the use of perchloric acid, but it will be found in general best to operate the above described cyclic process.

Other acids, for example, nitric acid, can be regenerated for reuse in the process by treating the two equivalents of nitrate salt, which would be formed if nitric acid were used for the decomposition operation, with sulfuric acid, for example. Thus in both cases where perchloric and nitric acids are used, a cyclic operation can be maintained since, except for minor make-up losses, once this system is started, no fresh additional nitric or perchloric acid need be added to the system. It will be appreciated that the consumed acid is in reality the acid used for the regeneration of the above two acids.

The operation of the invention in a cyclic manner depends primarily upon the formation of chlorine dioxide in step I, the chlorate decomposition step, and the use of it in step II, the chlorine dioxide absorption step, and secondarily, upon the consumption in step I of the chlorate formed and separated in step II. However, as has been pointed out, the two portions of the cycle, step I and step II, may be conducted separately and independently. Thus, step I can be operated to produce a perchlorate for marketing and chlorine dioxide for use in water purification or bleaching of pulp and paper, for example. Similarly, chlorine dioxide from any source can be utilized in step II for the production of a chlorate and a chlorite for marketing or use elsewhere.

It will be appreciated that the exact conditions for the operation of this invention, in respect to the variables involved, will depend upon the individual requirements to be met. The rate of chlorine dioxide generation in step I can be controlled by varying the temperature, the rate of chlorate feed, and the acid concentration. For any given rate of chlorine dioxide generation, and consequently, the rate at which it must be absorbed, the quantity of absorbing medium required may be changed by varying the temperature, the liquor circulation rate, the time of contact between the gas and the absorbing medium, and the concentration of the alkaline material in the absorbing medium. All of these features are primarily those encountered in normal chemical engineering practice, and the manner of arriving at a proper choice of conditions will largely be dictated by normal methods of applying chemical engineering procedures.

The following examples of representative cyclic operations utilizing this process will be given to illustrate some of the variations possible in both products and raw materials, and in methods of conducting the various steps.

*Example I*

Figure 2:
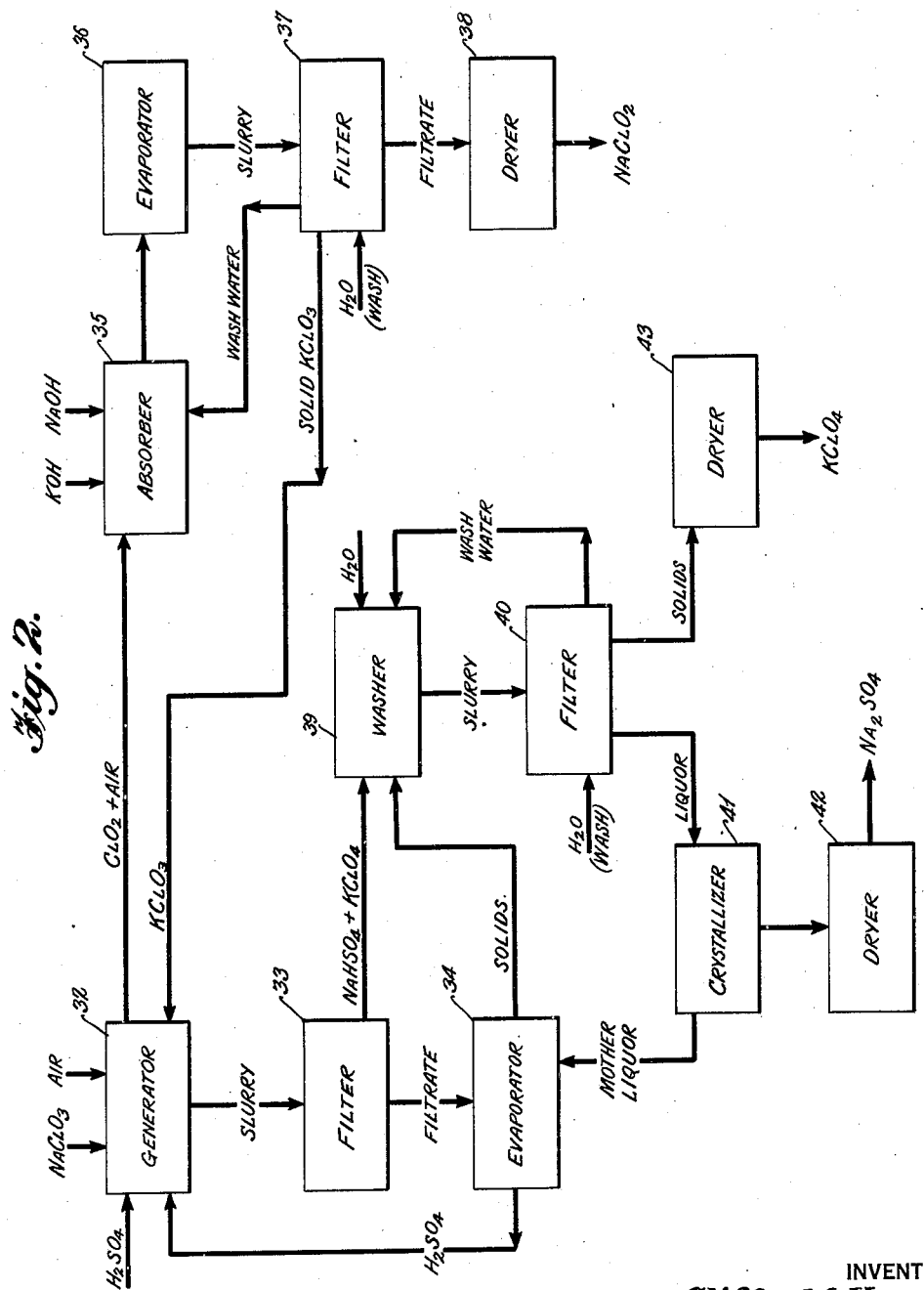

In the generator 32 in Figure 2, fresh concentrated sulfuric acid is mixed with reconcentrated sulfuric acid from the evaporator 34. Acid from the evaporator 34 is saturated with potassium perchlorate and sodium sulfate. To this acid is added potassium chlorate from the filter 37 and sodium chlorate, the mole ratio of sodium to potassium being two to one. Air passed through the generator 32 carries the chlorine dioxide formed there to the absorber 35 where it is reacted with a solution equimolar with respect to sodium and potassium hydroxides to form sodium chlorite and potassium chlorate. The slurry from the absorber, after substantial neutralization of the alkalis has been effected, is concentrated in evaporator 36 to precipitate substantially all of the potassium chlorate which is returned to the generator 32 after being separated in filter 37. Filtrate from this separation is dried in dryer 38 to give a product of solid sodium chlorite. The liquor from the generator 32 containing precipitated potassium perchlorate and sodium sulfate is passed to filter 33. The filtrate, consisting of sulfuric acid of over 60% sulfuric acid and saturated with respect to both potassium perchlorate and sodium sulfate, is concentrated in evaporator 34.

Liquor from this evaporator 34, consisting of about 85% sulfuric acid saturated with potassium perchlorate and sodium sulfate, is returned to the generator 32 for reuse. Solids from this evaporator 34 are combined with solids from filter 33 and treated with water in a washer 39. After filtration in filter 40 solid potassium perchlorate product is removed for drying in dryer 43. Filtrate from the filter 40 is cooled in a crystallizer 41 to precipitate sodium sulfate which is dried in dryer 42. Mother liquor from the crystallizer 41 is added to the feed to evaporator 34 for concentration. Wash water from the filter 40 can also be added to evaporator 34 for similar treatment. However, it can more advantageously be used in washer 39 along with fresh water. Similarly, wash water from filter 37, containing potassium chlorate, can be added back to the absorber 35 for making up the alkaline solution used there.

The overall reactions occurring in the above cycle can be expressed by the following equations, but the operations are not restricted thereby, the object of presenting these equations being for illustrative purposes only.

(k) $2NaClO_3 + KClO_3 + 2H_2SO_4 \rightarrow$
$2ClO_2 + KClO_4 + 2NaHSO_4 + H_2O$ (l) $2ClO_2 + KOH + NaOH \rightarrow KClO_3 + NaClO_2 + H_2O$ (m) $2NaHSO_4 \xrightarrow{aqua} Na_2SO_4 + H_2SO_4$ The reactants consist of two moles of sodium chlorate, and one mole each of sulfuric acid, potassium hydroxide and sodium hydroxide, and the products are one mole each of potassium perchlorate, sodium chlorite and sodium sulfate.

*Example II*

Figure 3:
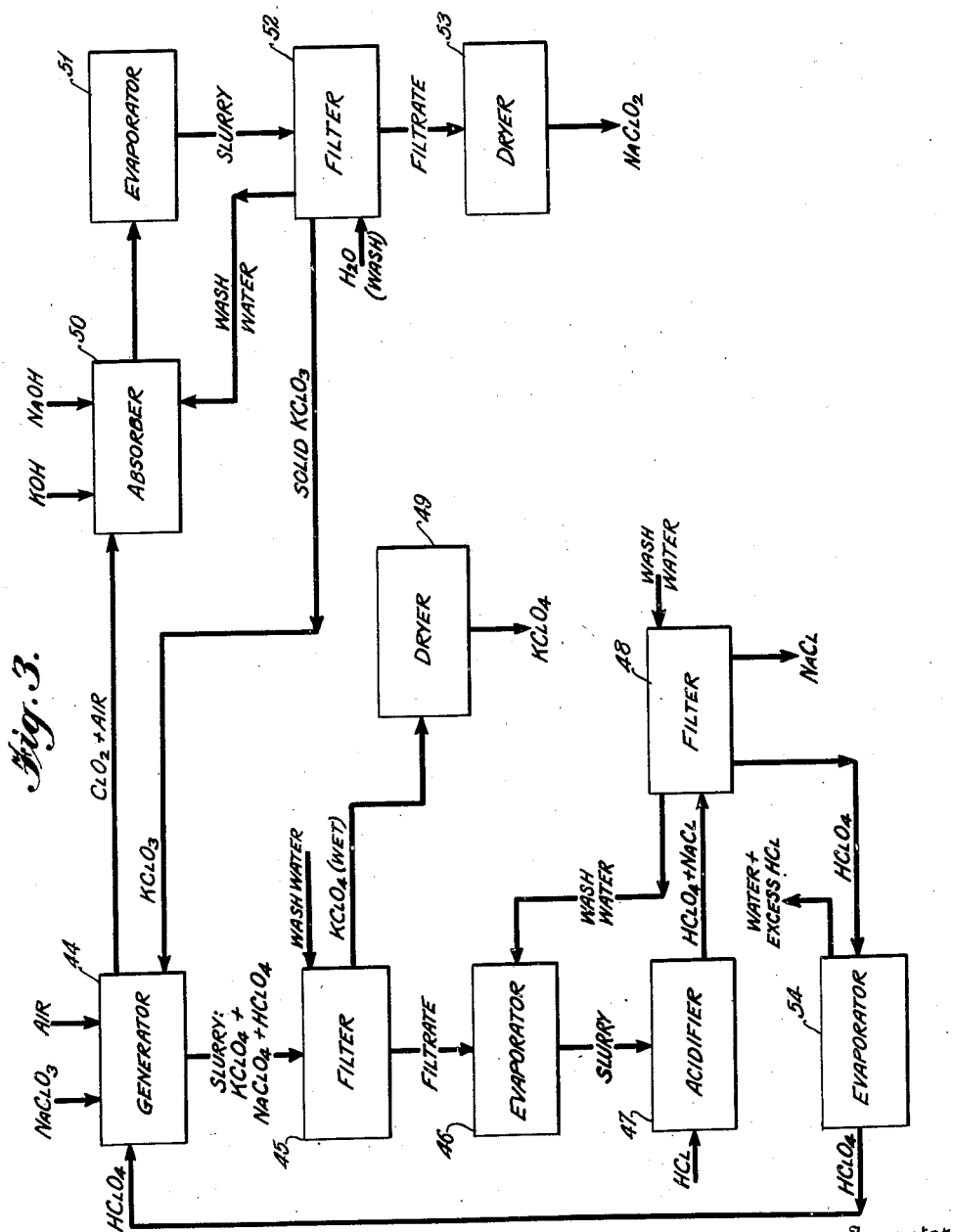

This cycle, illustrated in Figure 3, involves the use of perchloric acid, and potassium and sodium chlorates in the decomposition step. In the generator 44 concentrated perchloric acid from the final step of the preparation of it in filter 48 is reacted with two moles of fresh sodium chlorate and one mole of potassium chlorate returning from filter 52, where it was separated after being formed in the chlorine dioxide absorber 50. The chlorine dioxide formed by the chlorate decomposition and diluted with air passed through generator 44 is absorbed in absorber 50 in an equimolar solution of potassium and sodium hydroxide. The substantially neutral slurry of sodium chlorite and potassium chlorate leaving the absorber 50 is concentrated to the solubility limit of sodium chlorite in evaporator 51. The precipitated potassium chlorate is separated by filtration in filter 52 for return to the generator 44. Wash water used in filter 52 is returned to the absorber 50 to make up the mixed alkali solution. Filtrate from filter 52, consisting essentially of sodium chlorite containing a small amount of potassium chlorate, is dried in dryer 53 to form solid sodium chlorite for marketing.

The slurry of one mole of potassium perchlorate, two moles of sodium perchlorate and the excess diluted perchloric acid from the generator 44 is filtered in filter 45 to remove substantially all of the potassium perchlorate. This wet cake of potassium perchlorate is washed free of perchloric acid and sodium perchlorate and dried in dryer 49 to form a solid potassium perchlorate product.

Filtrate from filter 45 combined with wash water used in the potassium perchlorate filtration is fed to evaporator 46 for concentration. Sodium perchlorate is precipitated during this concentration to about 65% perchloric acid. Slurry from evaporator 46 is treated in acidifier 47 with hydrogen chloride or concentrated hydrochloric acid in slight excess of the total perchlorate salt content of the feed. Sodium chloride is formed and precipitated by this method of perchloric acid regeneration. The contents of the acidifier 47 are filtered in filter 48 to separate the precipitated sodium chloride. Wash water used in washing the sodium chloride filter cake is added to evaporator 46 for concentration. The perchloric acid filtrate from filter 48 is further concentrated by evaporation, preferably under a partial vacuum, and during this process any excess hydrogen chloride is driven off along with the water. Also, the small amount of sodium chloride in the perchloric acid as it leaves filter 48 is converted to hydrogen chloride and driven off by the heating in the evaporator. Therefore, very little chloride ion is left in the concentrated perchloric acid returned to the generator 44. The solubility of sodium chloride in concentrated perchloric acid is of the order of 0.01% or less by weight. While a separate evaporator 54 is shown in the flow sheet, Figure 3, for this final concentration step, evaporator 46 could be used alternately for the two evaporation steps.

The overall reactions occurring in the above cycle can be expressed by the following equations; the operations are not restricted thereby, the object of presenting these equations being for illustrative purposes only:

(n) $2NaClO_3 + KClO_3 + 2HClO_4 \rightarrow$
$KClO_4 + 2NaClO_4 + 2ClO_2 + H_2O$ (o) $2NaClO_4 + 2HCl \rightarrow 2NaCl + 2HClO_4$ (p) $2ClO_2 + KOH + NaOH \rightarrow KClO_3 + NaClO_2 + H_2O$ The reactants consist of two moles each of sodium chlorate and hydrogen chloride and one mole each of potassium hydroxide and sodium hydroxide, and the products are one mole each of potassium perchlorate and sodium chlorite and two moles of sodium chloride.

Example III

Figure 4:
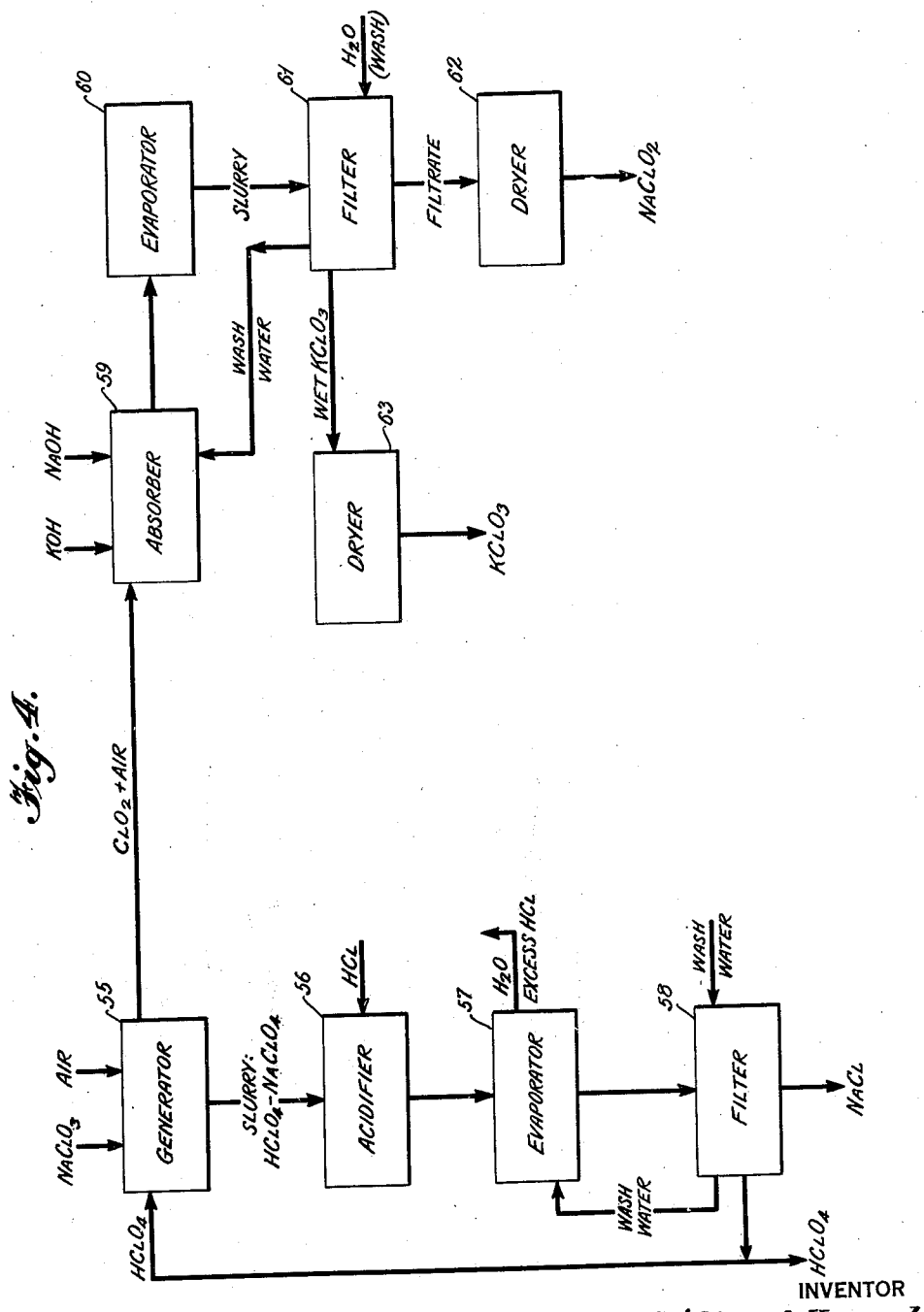

This particular cycle illustrates the production of perchloric acid, potassium chlorate and sodium chlorite, utilizing as raw materials perchloric acid, sodium chlorate and potassium and sodium hydroxides. Figure 4 is a diagrammatic sketch of the operations involved in this particular process. Three moles of sodium chlorate are reacted in the generator 55 with two moles of perchloric acid which have been regenerated in acidifier 56 and returned to the generator 55 from filter 58. The temperature in the generator is kept at about 60° C.

Two moles of chlorine dioxide are formed and are removed from the generator 55 by passage of sufficient air through the generator to keep the partial pressure of the chlorine dioxide at about 50 mm. Hg. This chlorine dioxide-air mixture is passed through the absorber 59 where the chlorine dioxide is absorbed by an equal molar mixture of sodium and potassium hydroxides in aqueous solution. The neutralized solution from the absorber 59 containing equal moles of potassium chlorate and sodium chlorite, is evaporated in evaporator 60 to a concentration at which all of the sodium chlorite remains in solution. Over 90% of the potassium chlorate, at this point, is present in the solid phase at 25° C. The slurry from the evaporator is filtered in filter 61 to remove solid potassium chlorate. Wash water is used in this filter in amounts sufficient to substantially remove all of the sodium chlorite adhering to the potassium chlorate crystals and this wash water is used to make up the hydroxide solution in absorber 59.

The wet potassium chlorate crystals are dried in dryer 63 to give a solid dry potassium chlorate product. The filtrate from filter 61, containing only a small amount of potassium chlorate, is dried in dryer 62, which may be a drum dryer, to give a solid sodium chlorite product. In another manner of operating, the filtrate from filter 61 may be cooled to precipitate sodium chlorite trihydrate which is then dried to the anhydrous form in the dryer 62. The mother liquor from this step would be fed to the absorber 59 for reuse.

The aqueous slurry of excess perchloric acid and sodium perchlorate formed in the generator 55 is treated in acidifier 56 with hydrochloric acid in quantities sufficient to convert all of the sodium perchlorate to perchloric acid. Substantially all of the sodium chloride formed by the reaction is precipitated in the solid form and filtered off on filter 58. Resultant perchloric acid solution is concentrated in evaporator 57 to remove water and also chloride ion as hydrogen chloride. The solid sodium chloride is washed with water, said wash water being returned to the evaporator for reconcentration. Since the generator 55 end liquor contains three moles of sodium perchlorate, whereas only two moles of perchloric acid are used in the generator, one mole of perchloric acid is thus available for marketing. The equations representing the reactions involved in this cycle are:

(q) $3NaClO_3 + 2HClO_4 \rightarrow 2ClO_2 + 3NaClO_4 + H_2O$ (r) $3NaClO_4 + 3HCl \rightarrow 3HClO_4 + 3NaCl$ (s) $2ClO_2 + KOH + NaOH \rightarrow KClO_3 + NaClO_2 + H_2O$ This cycle of operation is particularly advantageous in that reconcentration of the excess perchloric acid used in the generator step is effected at the same time that the salt of the acid, sodium perchlorate, is reconverted to perchloric acid for reuse in the chlorate decomposition step. Outside of handling losses the cycle is self-sufficient with respect to perchloric acid.

Example IV

Figure 5:
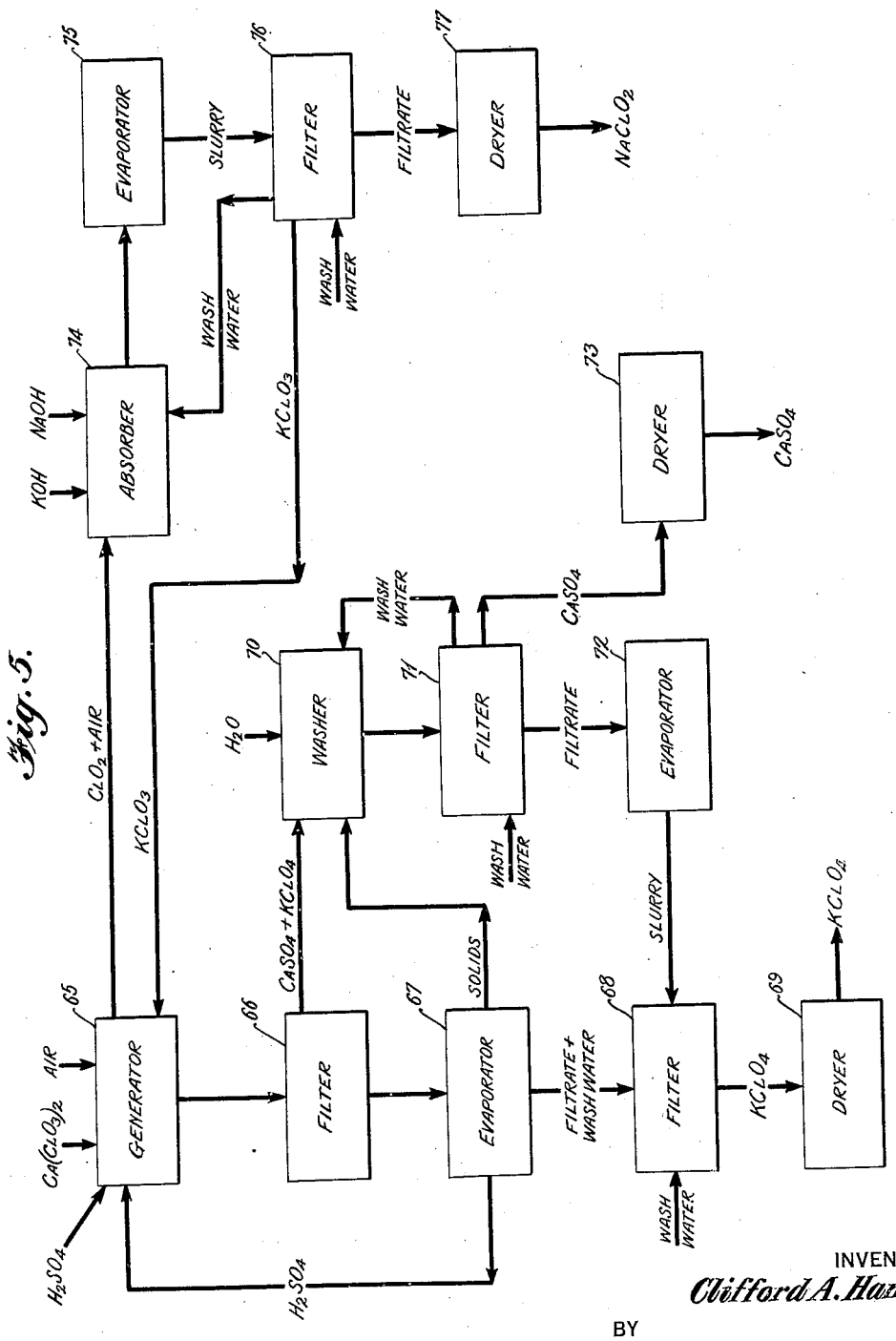

This embodiment of the invention illustrates the use of calcium chlorate, sulfuric acid and sodium and potassium hydroxides to form potassium perchlorate, calcium sulfate and sodium chlorite. Figure 5 is the flow diagram for this example. A mixture of two equivalents of calcium chlorate and one of potassium chlorate, said potassium chlorate being recycled from the filter 76, is acidified in the generator 65 with sulfuric acid of about 85% concentration to form one mole each of calcium sulfate and potassium perchlorate along with two moles of chlorine dioxide. The generator is kept at a temperature of 40–60° C.

The passage of air through the generator removes the chlorine dioxide as formed to the absorber 74 and, at the same time, serves as a diluent to keep the partial pressure of the chlorine dioxide in the gas phase below about 5% concentration. The chlorine dioxide is absorbed in the absorber 74 with a mixture of equal moles of potassium and sodium hydroxides in aqueous solution to form one mole of potassium chlorate and one mole of sodium chlorite. The neutralized solution from the absorber is concentrated in evaporator 75 to a point at which sufficient water is present to keep the sodium chlorite in solution. Most of the potassium chlorate is precipitated at this time.

The slurry from the evaporator is filtered in filter 76 to separate solid potassium chlorate which is reused in the generator 65. Wash water is added to the filter cake in the filter 76 to remove substantially all of the sodium chlorite from the potassium chlorate crystals. This wash water is then added to the absorber 74, as part of the solution used there. The filtrate from the filter 76, consisting principally of sodium chlorite in solution, is dried as such in dryer 77 to give a solid sodium chlorite product. The filtrate may be treated in a different manner to recover the sodium chlorite by cooling it so as to precipitate sodium chlorite trihydrate which is then dried to the anhydrous form. Mother liquor from this crystallization is fed to the absorber as part of the absorbing solution.

The contents of the generator 65, after chlorine dioxide has been removed, consist of a slurry of calcium sulfate and potassium perchlorate in the excess sulfuric acid whose concentration is now about 70%. The precipitated salts are removed in filter 66 and treated in washer 70 with sufficient hot water to dissolve the potassium perchlorate. The slurry from the washer 70, consisting of precipitated calcium sulfate and a solution of potassium perchlorate, is filtered in filter 71 to separate out the calcium sulfate which is dried to a solid dry product in the dryer 73. The wash water used in filter 71 to remove the potassium perchlorate adhering to the calcium sulfate crystals is of sufficient quantity to supply most of the water necessary for use in washer 70. Filtrate from the filter 71 is evaporated in evaporator 72 to precipitate substantially all of the potassium perchlorate.

The slurry from evaporator 72, containing precipitated potassium perchlorate and dilute sulfuric acid, is filtered in filter 68 to separate the solid potassium perchlorate which is dried in dryer 69 to a solid marketable product. Filtrate from filter 68 plus wash water used there, is fed to the evaporator 67 where it is concentrated along with the filtrate from filter 66 to give sulfuric acid of such concentration as to be suitable for reuse in the generator 65. Any solids precipitated by this concentration process in evaporator 67 are added to the washer 70 for reworking. The sulfuric acid from evaporator 67 is used in the generator 65 with sufficient fresh acid to give the desired quantity and concentration of acid for use in the chlorate decomposition step. The reactions occurring in this cycle can be represented by the following equations:

(t) $Ca(ClO_3)_2 + KClO_3 + H_2SO_4 \rightarrow$
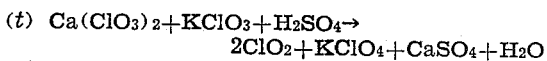
$2ClO_2 + KClO_4 + CaSO_4 + H_2O$ (u) $2ClO_2 + KOH + NaOH \rightarrow KClO_3 + NaClO_2 + H_2O$

*Example V*

Figure 6:
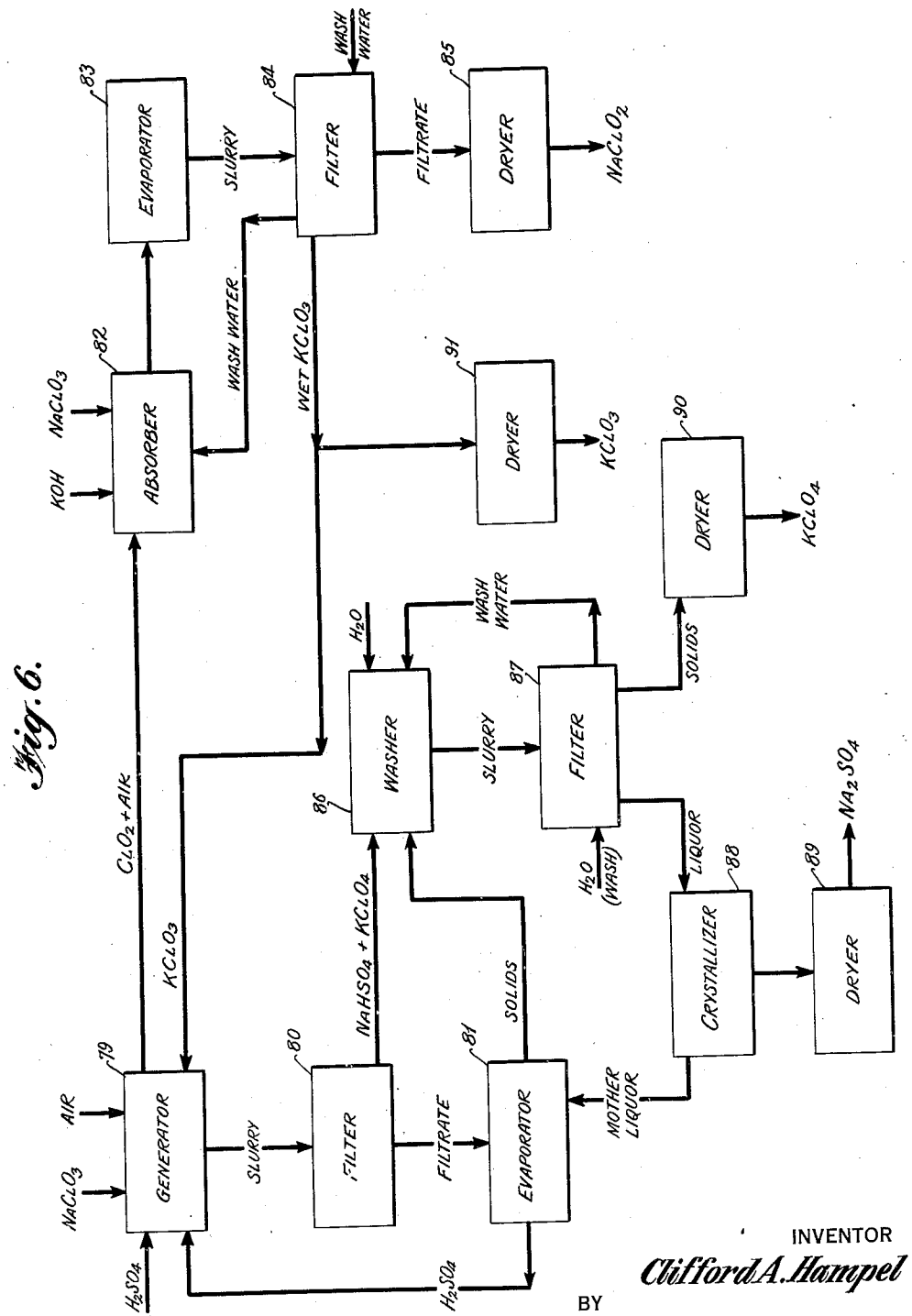

This example illustrates the use of an alkaline absorbing medium in which one of the two metal ions required for the chlorite-chlorate formation is supplied as a salt rather than an alkali. Figure 6 is the flow diagram for this method of operating the invention. A mixture of two moles of sodium chlorate and one mole of potassium chlorate, the latter being formed in another part of the cycle and returned from the filter 84, are acidified in the generator 79 with sulfuric acid of about 85% concentration while the temperature is kept at about 60° C. Two moles of chlorine dioxide, one mole of potassium perchlorate and one mole of sodium sulfate are formed by this reaction. Chlorine dioxide is removed from the generator by passage of sufficient air through the generator to keep the concentration of the chlorine dioxide concentration below about 5% by volume.

This chlorine dioxide-air mixture is passed into the absorber 82 where the chlorine dioxide is absorbed by a mixture of two moles of potassium hydroxide and one mole of sodium chlorate in aqueous solution. This reaction forms two moles of potassium chlorate and one mole of sodium chlorite. The neutralized solution from the absorber 82 is evaporated in evaporator 83 to a concentration sufficient to keep all of the sodium chlorite in solution and to precipitate most of the potassium chlorate.

Slurry from the evaporator 83 is filtered in filter 84 to separate the precipitated potassium chlorate. The wash water used in filter 84 is utilized in the absorber 82 to make up fresh absorbing solution. Filtrate from the filter 84, consisting principally of sodium chlorite, is dried in dryer 85 to give a solid dry sodium chlorite product. The wet potassium chlorate filter cake in filter 84 is separated into two equal parts, one of which is dried in dryer 91 to give potassium chlorate product for marketing; the other portion is used in the generator 79 to supply the potassium chlorate needed there.

Slurry from the generator 79, comprising two moles of sodium bisulfate, one mole of potassium perchlorate and sulfuric acid of about 70% concentration, is filtered in filter 80 to separate the solids which are treated with water in washer 86, said water being of sufficient quantity to dissolve all of the sodium bisulfate. The slurry from washer 86, comprising solid potassium perchlorate in a solution of sodium sulfate, sulfuric acid and water, is filtered in filter 87 to separate the potassium perchlorate. Wash water used in filter 87 to remove the sodium sulfate and sulfuric acid adhering to the potassium perchlorate crystals is used in water 86 to supply all or a portion of the water required there.

Solids from filter 87 are dried in dryer 90 to give a very pure potassium perchlorate product. Filtrate from filter 87 is passed to a crystallizer 88 where it is cooled to precipitate sodium sulfate decahydrate. This decahydrate is dried in dryer 89 to give anhydrous sodium sulfate. Mother liquor from the crystallizer is passed to evaporator 81 where it is mixed with filtrate from the filter 80 and concentrated to give about 85% sulfuric acid. Any solids precipitating during this evaporation are fed to the washer 86 along with filter cake from the filter 80. Sulfuric acid from the evaporator 81 is reused in generator 79 along with the required quantity of fresh sulfuric acid to conduct the chlorate decomposition step.

The reactions utilized in this embodiment of the invention are represented by the following equations:

(v) $2NaClO_3 + KClO_3 + H_2SO_4 \rightarrow$
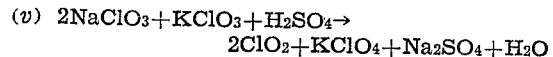
$2ClO_2 + KClO_4 + Na_2SO_4 + H_2O$ (w) $2ClO_2 + 2KOH + NaClO_3 \rightarrow$
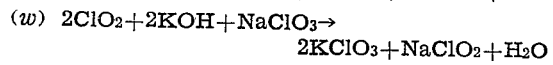
$2KClO_3 + NaClO_2 + H_2O$ It will be noted that by Equation w, two moles of potassium chlorate are formed rather than the usual one mole per mole of sodium chlorite, which would result from the reaction with chlorine dioxide of equal moles of the hydroxides of sodium and potassium. Thus, potassium chlorate over and above the amount required for the chlorate decomposition is produced for marketing.

*Example VI*

Figure 7:
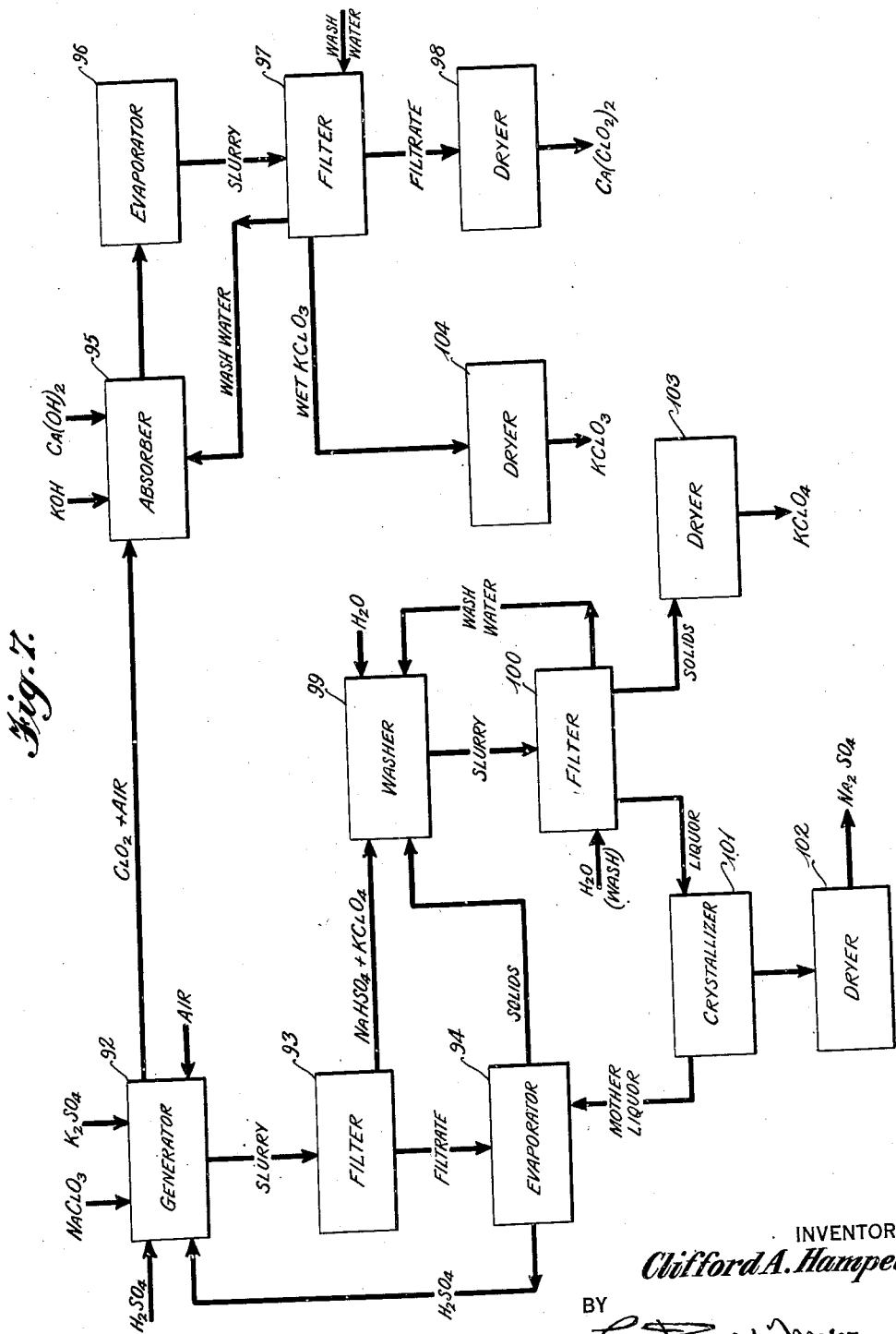

This example of a cyclic embodiment of the invention illustrates the use of a salt other than a chlorate to introduce one of the two different metal ions required for the formation of a perchlorate and the salt of the acid used in step I. It also illustrates the formation of a chlorite other than sodium in step III, the chlorine dioxide absorption step. Figure 7 is the schematic flow diagram of this cycle.

Potassium perchlorate, sodium sulfate, potassium chlorate and calcium chlorite are produced in this cycle from sodium chlorate, potassium sulfate, sulfuric acid, potassium hydroxide and calcium hydroxide.

A mixture of three moles of sodium chlorate and one-half mole of potassium sulfate are treated in the generator 92 with sufficient 85% sulfuric acid at temperature above room temperature, but below about 65° C. to totally decompose the chlorate. This operation forms two moles of chlorine dioxide, one mole of potassium perchlorate and one and one-half moles of sodium sulfate. The chlorine dioxide formed in the generator 92 is removed from the generator by the continuous passage of sufficient air to keep the chlorine dioxide concentration in the exit gases at about 30 mm. Hg. partial pressure. The chlorine dioxide-air mixture is treated in absorber 95 with a slurry of one mole of potassium hydroxide and one-half mole of calcium hydroxide in an aqueous medium to form one mole of potassium chlorate and one-half mole of calcium chlorite from the chlorine dioxide absorption.

As in the other examples, the slurry leaving the absorber is concentrated in evaporator 96 to sufficient water content to hold all of the calcium chlorite in solution. Most of the potassium chlorate is precipitated at this point. The slurry from the evaporator 96 is filtered in filter 97 to separate out potassium chlorate, and wash water used therein is fed to the absorber 95 for use in making up fresh absorbing mixture. The wet potassium chlorate from the filter 97 is dried in dryer 104 to give a dry solid potassium chlorate product. Filtrate from filter 97, which is a solution of calcium chlorite, containing a small amount of potassium chlorate, is dried in dryer 98 to give a solid calcium chlorite product. Alternately, the filtrate from filter 97 can be cooled to separate a hydrated calcium chlorite which is then dried in dryer 98. In this latter case, the mother liquor is fed either to the absorber 95, or to the evaporator 96, as desired.

The slurry from the generator 92, after all of the chlorate has been decomposed and the chlorine dioxide stripped off, is passed to filter 93 where the solid potassium perchlorate and sodium sulfate are separated. These solids are treated in washer 99 with sufficient water to dissolve all of the sodium sulfate. Slurry from the washer 99, consisting of solid potassium perchlorate in a solution of sodium sulfate and sulfuric acid, is filtered in filter 100 to separate the potassium perchlorate, which is dried in dryer 103 to a solid potassium perchlorate product. Sufficient wash water is used in filter 100 to remove substantially all of the sodium sulfate and sulfuric acid adhering to the potassium perchlorate crystals, and this wash water is used in washer 99 to supply all or part of the water required there to dissolve the sodium sulfate.

Filtrate from filter 100 is cooled in crystallizer 101 to precipitate sodium sulfate decahydrate. This hydrated sodium sulfate is dried in dryer 102 to form anhydrous sodium sulfate. Mother liquor from the crystallizer 101 is concentrated in evaporator 94 along with the filtrate from filter 93 to give a sulfuric acid solution of a concentration sufficient for reuse in generator 92. Solids formed in this evaporation are fed to the washer 99 for reworking. The concentrated sulfuric acid from the evaporator 94 is reused in the generator 92 along with fresh acid for subsequent chlorate decomposition operations. The quantity of fresh acid needed in the generator 92 is equivalent to two-thirds of the sodium sulfate removed from the process in dryer 102.

The chemical reactions involved in this embodiment of the invention can be expressed by the following equations:

$x$. $3NaClO_3 + \frac{1}{2}K_2SO_4 + H_2SO_4 \rightarrow$
$KClO_4 + 1\frac{1}{2}Na_2SO_4 + 2ClO_2 + H_2O$ $y$. $2ClO_2 + KOH + \frac{1}{2}Ca(OH)_2 \rightarrow$
$KClO_3 + \frac{1}{2}Ca(ClO_2)_2 + H_2O$ It will be noted that all of the chlorate required for the chlorate decomposition is supplied as sodium chlorate. The potassium ion necessary for the formation of potassium perchlorate is supplied by the use of a potassium salt, namely, potassium sulfate. It will also be noted that the alkaline absorbing medium for the reaction with the chlorine dioxide consists of equivalent parts of sodium and calcium hydroxides.

Example VII

This example illustrates a cyclic embodiment of the invention whereby sodium perchlorate, calcium sulfate and calcium chlorite are produced from sulfuric acid, calcium chlorate, calcium hydroxide and sodium hydroxide. Sodium chlorate and chlorine dioxide are produced and consumed within the cycle. The example further illustrates how a perchlorate other than potassium may be prepared and separated as a product.

Figure 8:
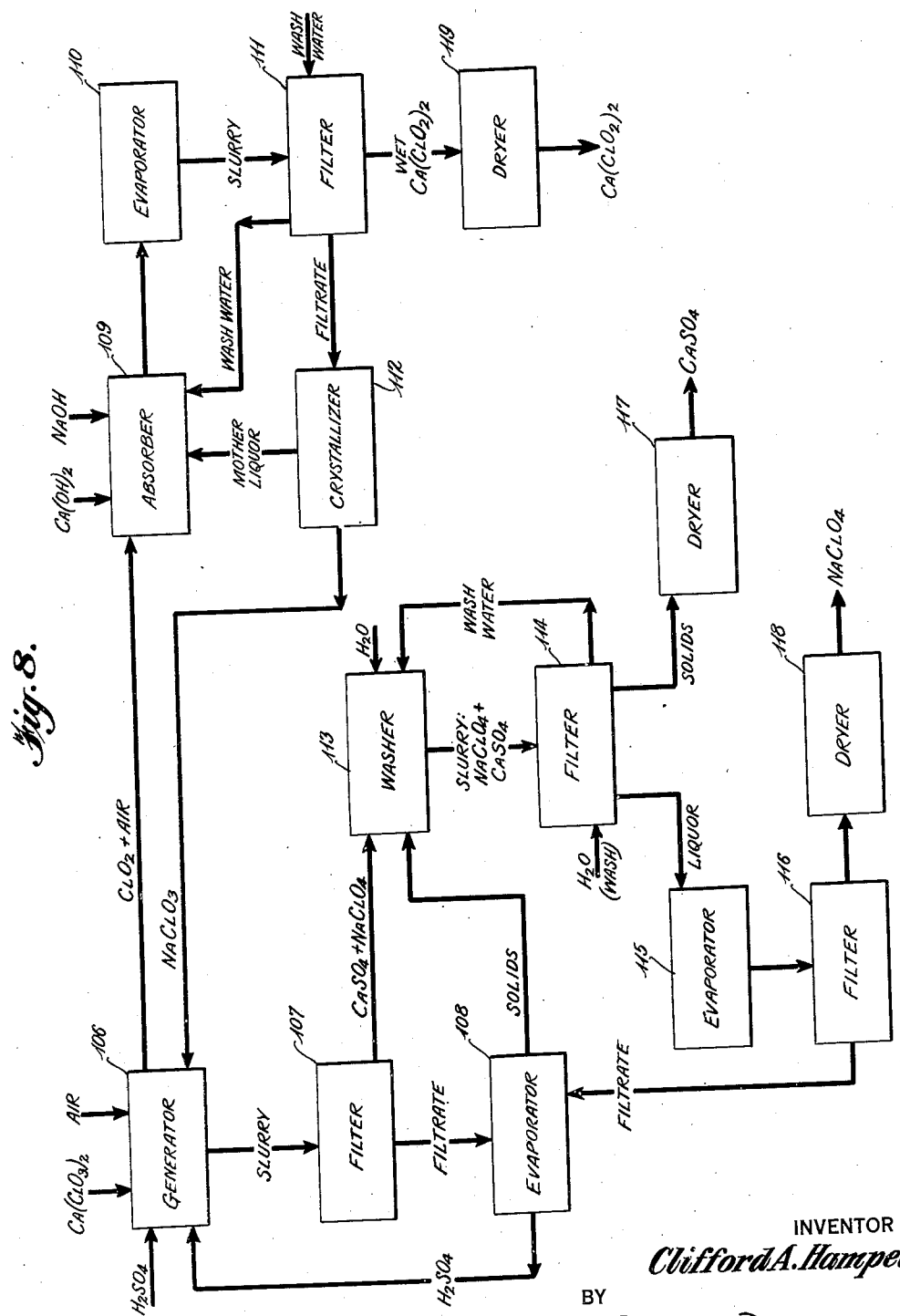

Figure 8 is the schematic flow diagram of this cycle. One mole of calcium chlorate and one mole of sodium chlorate are acidified with an excess of sulfuric acid of about 85% concentration in the generator 106. The temperature is kept at about 60° C. and the chlorates are totally decomposed. Sodium chlorate for this operation is derived in another portion of the cycle and returned to the generator 106 from crystallizer 112. The above treatment forms two moles of chlorine dioxide, and one mole each of sodium perchlorate and calcium sulfate, and an amount of sulfuric acid equivalent to the calcium sulfate is consumed. The chlorine dioxide is removed from the generator by a stream of air passed through the generator in sufficient quantity to keep the chlorine dioxide concentration at about 30 mm. Hg partial pressure.

Chlorine dioxide is removed from the chlorine dioxide-air mixture by passing the gases through the absorber 109 wherein the chlorine dioxide is absorbed by a slurry containing equivalent parts of calcium and sodium hydroxides in aqueous medium to form equivalent parts of sodium chlorate and calcium chlorite. The absorber end liquor, substantially free of basic material, is concentrated by evaporation in evaporator 110 to such a water content as to keep all of the sodium chlorate in solution. At this point, the calcium chlorite dissolved in the liquor is less than 10% of all of the calcium chlorite present, the rest being present as a solid precipitate. The slurry from the evaporator is filtered in filter 111 to separate the precipitated calcium chlorite which is then dried in dryer 119 to yield a solid dry product.

Wash water used in filter 111 is used in the absorber 109 as part of the makeup for the absorbing slurry. This wash water is used in the filter 111 to remove residual mother liquor from the calcium chlorite crystals. Filtrate from filter 111, saturated with both sodium chlorate and calcium chlorite, is cooled in crystallizer 112 to precipitate sodium chlorate crystals which are used in the chlorate decomposition step as mentioned above. Mother liquor from the crystallizer 112 is returned to absorber 109 where it becomes part of the makeup of another batch of chlorine dioxide absorbing medium.

The slurry from the generator 106, after all of the chlorate has been decomposed and the chlorine dioxide stripped off, is a mixture of solid calcium sulfate and sodium perchlorate in the excess sulfuric acid of between 65 and 70% concentration. It is filtered in filter 107 to remove the solids which are treated in washer 113 with sufficient water to dissolve all of the sodium perchlorate. Slurry from this washer, consisting of solid calcium sulfate in a solution of sodium perchlorate and a small amount of sulfuric acid, is filtered in filter 114 to remove the calcium sulfate which is dried to a solid dry product in dryer 117.

Wash water used in filter 114 to free the calcium sulfate of adhering mother liquor is used in washer 113 to supply all or part of the water required there.

Filtrate from filter 114 is almost completely free of calcium sulfate. It is evaporated in evaporator 115 to precipitate sodium perchlorate which is removed in filter 116 and dried in dryer 118 to give a solid sodium perchlorate product. Mother liquor from filter 116 is returned to evaporator 108 for reworking along with the filtrate from filter 107. These two liquors are concentrated in evaporator 108 to obtain sulfuric acid of strength required for reuse in the generator 106 along with fresh sulfuric acid, the latter being equivalent in quantity to the calcium sulfate removed from the process. Any solids formed in the evaporator 108 are added to washer 113 for reworking. The sulfuric acid from the concentration operation at evaporator 108 is saturated with sodium perchlorate.

The chemical reactions occurring in this embodiment of the invention are represented by the following equations:

z. $Ca(ClO_3)_2 + NaClO_3 + H_2SO_4 \rightarrow$
$2ClO_2 + NaClO_4 + CaSO_4 + H_2O$ aa. $2ClO_2 + \frac{1}{2}Ca(OH)_2 + NaOH \rightarrow$
$NaClO_3 + \frac{1}{2}Ca(ClO_2)_2 + H_2O$ It will be noted that two of the three equivalents of chlorate are supplied by the calcium chlorate and one by the sodium chlorate. The calcium of the calcium chlorate ends up as the salt of the acid used, namely, calcium sulfate, and the sodium of the sodium chlorate, as sodium perchlorate.

*Example VIII*

Figure 9:
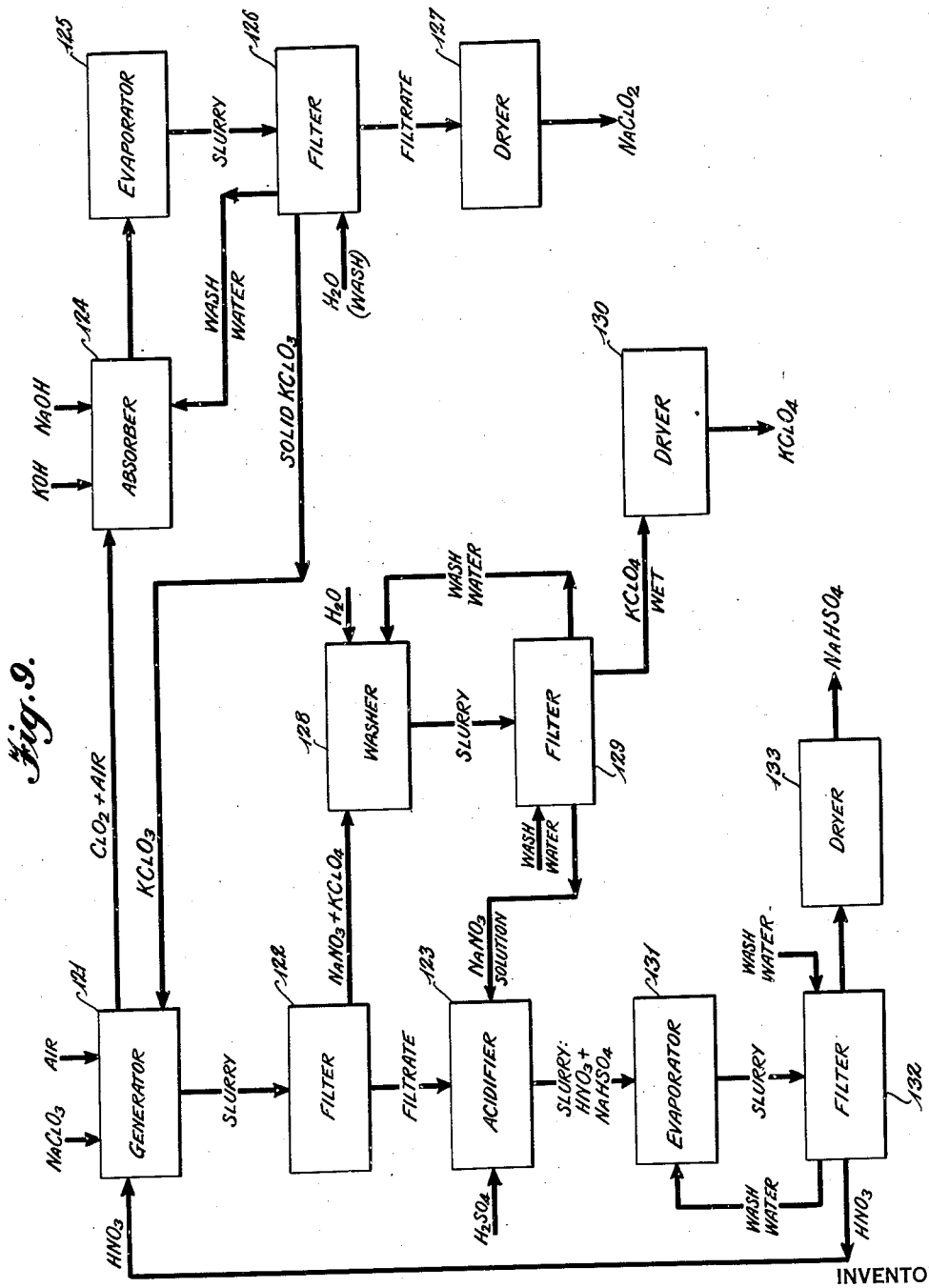

This example illustrates the use and recovery of nitric acid in a cycle somewhat similar to that described in Example II (Figure 3) wherein perchloric acid is used and regenerated. Potassium perchlorate, sodium bisulfate and sodium chlorite are made from raw materials comprising sulfuric acid, sodium chlorate and sodium and potassium hydroxides. Nitric acid, sodium nitrate, potassium chlorate and chlorine dioxide are produced and consumed within the process as intermediates, although any of them may be diverted as products with consequent changes in the operations which will be apparent to those skilled in the art. Figure 9 is a schematic flow diagram showing the particular mode of operation to be described.

Two moles of sodium chlorate and one mole of potassium chlorate are decomposed in generator 121 at a temperature of about 60° C. by the action of an excess of concentrated nitric acid which is returned from the acid recovery portion of the cycle, as shown in Figure 9. The potassium chlorate is formed in another portion of the cycle and may enter the generator 121 in the form of wet crystals. The generator reaction produces two moles of chlorine dioxide, one mole of potassium perchlorate and two moles of sodium nitrate. Two moles of nitric acid are consumed. The chlorine dioxide is removed as generated from the generator 121 by passage of air through the generator in an amount sufficient to keep the chlorine dioxide concentration at about 30 mm. Hg partial pressure and is absorbed in absorber 124 by a solution containing equal moles of potassium and sodium hydroxides. Equal moles of potassium chlorate and sodium chlorite are formed by this reaction. The separation of these two compounds is effected in a manner previously described in Examples I, II, III and IV, the potassium chlorate being returned to the generator 121 while the sodium chlorite is obtained as a product.

After the chlorate decomposition has been effected and all of the chlorine dioxide stripped off, the slurry from the generator 121 is filtered in filter 122 to remove the precipitated sodium nitrate and potassium perchlorate from the diluted nitric acid. The separated solids are placed in washer 128 where enough water is present to dissolve all of the sodium nitrate. The resultant slurry is filtered in filter 129 to remove the solid potassium perchlorate which is dried in dryer 130 to give a solid dry product.

Wash water is used on the filter cake in the filter 129 to remove substantially all of the sodium nitrate and nitric acid adhering to the solid potassium perchlorate. This wash water is added to washer 128 to supply all or part of the water needed to dissolve the sodium nitrate fed to the washer. Filtrate from filter 129 is a substantially saturated sodium nitrate solution. It is added to acidifier 123 along with the filtrate from filter 122, where it is treated with concentrated sulfuric acid to regenerate nitric acid from the sodium nitrate present, sodium acid sulfate being formed also in the reaction.

The quantity of sulfuric acid required for this conversion is at least mole for mole on the basis of the sodium nitrate treated. Some of the sodium bisulfate formed is precipitated from the nitric acid. The slurry from the acidifier 123 is concentrated in the evaporator 131 to give nitric acid of the strength desired for use in the chlorate decomposition operation. More sodium acid sulfate is precipitated here. The slurry from the evaporator is filtered in filter 132 to separate sodium acid sulfate which is dried in dryer 133 to a solid product.

Wash water is used on the filter cake in filter 132 to remove any nitric acid adhering to the bisulfate crystals, the wash water being added to the contents of the evaporator 131 or to the acidifier 123 for recovery of the nitric acid in it. The concentrated nitric acid coming from the filter 132 as a filtrate is saturated with respect to sodium acid sulfate.

If it is desired, the nitric acid regeneration operation may be omitted from this cycle. In this case, sodium nitrate would be removed as a product by evaporating and drying the sodium nitrate solution leaving the washer 128. Fresh nitric acid equivalent to the amount of sodium nitrate recovered would then have to be added to the chlorate decomposition operation.

The chemical reactions involved in this cyclic operation are represented by the following equations:

bb. $2NaClO_3 + KClO_3 + 2HNO_3 \rightarrow$
$2NaNO_3 + KClO_4 + 2ClO_2 + H_2O$ cc. $2ClO_2 + KOH + NaOH \rightarrow KClO_3 + NaClO_2 + H_2O$ dd. $2NaNO_3 + 2H_2SO_4 \rightarrow 2HNO_3 + 2NaHSO_4$ Here, as in the case of perchloric acid, two moles of nitric acid are consumed by Equation bb for every three moles of chlorate decomposed. The salt of the acid formed, sodium nitrate in this case, is equivalent to twice the amount of the perchlorate formed.

Related subject matter is disclosed and claimed in applicant's copending applications, Serial Nos. 647,403 and 647,404, filed of even date herewith. Serial No. 647,403 relates to a process for producing a perchlorate and chlorine dioxide, and 647,404 is directed to a process for production of a chlorate and a chlorite of different metals.

Reference is here made also to applicant's co-pending applications, Serial Nos. 736,113, filed April 20, 1947, and 756,542; 756,543; 756,544 filed June 23, 1947, which applications are directed to processes for the separation of various specific products which may be produced by the process of this application or the process of application 659,043.

Having thus described the invention, I claim:

1. A cyclic process for producing a perchlorate of a metal and for producing a chlorite of a different metal, which comprises reacting in a substantially halide-free medium an excess amount of a strong mineral acid, a metal chlorate, and a third reactant selected from the group consisting of a chlorate of a different metal and a different soluble salt of a different metal, said metals being selected from the group consisting of potassium, sodium, lithium, calcium, barium, strontium, and magnesium, said third reactant when a chlorate being reacted with the acid by a procedure selected from the group consisting of (1) simultaneously with said first chlorate, (2) successively after reaction of said first chlorate and said acid, and (3) separately with a portion of said acid with subsequent combining of the products of the separate acid-chlorate decompositions, said additional reactant when a salt other than a chlorate being introduced into the reaction mixture in a manner selected from the group consisting of (1) conjointly with the said chlorate and (2) after the acid-chlorate decomposition whereby is produced a perchlorate of one of the selected metals, a salt product formed from another of the selected metals and from the anion of the acid employed, and chlorine dioxide, the metal of the perchlorate desired being introduced in about one-third the amount of the total chlorate consumed on an equivalent weight basis, said acid being so selected that the anion thereof does not form an insoluble salt with the metal whose perchlorate is desired, and said chlorate and said different chlorate and salt being so selected that substantially no potassium ion is present when a perchlorate other than potassium is desired, reacting the chlorine dioxide thus produced with a compound selected from the class consisting of hydroxides and carbonates, and as an additional reactant another compound selected from said class and from soluble salts other than carbonates, the metal of said first-mentioned compound being selected from the group consisting of lithium, sodium, potassium, calcium, barium, strontium and magnesium, and the metal of the second-mentioned compound being a different metal selected from said group, said additional reactant when selected from the group consisting of hydroxides and carbonates being reacted with the chlorine dioxide by a procedure selected from the following group (1) simultaneously with said first mentioned compound, (2) successively after reaction of the chlorine dioxide and said first mentioned compound, and (3) separately with a portion of said chlorine dioxide with subsequent combining of the products of the separate reactions, said additional reactant when a salt other than a carbonate being introduced into the reaction mixture in a manner selected from the group consisting of (1) conjointly with the said first mentioned compound, and (2) after the reaction of the chlorine dioxide with the first mentioned compound when said compounds are both selected from said class of hydroxides and carbonates, each being present in about half the amount of the chlorine dioxide consumed on a stoichiometrically equivalent basis, and when the second-mentioned compound is a soluble salt other than a carbonate, said salt being present in approximately half the amount of said first-mentioned compound and approximately half the amount of the chlorine dioxide consumed on a stoichiometrically equivalent basis, said first-mentioned compound and said salt being so selected that the metal of the former reacts with the anion of the latter to form as a third product a salt of relatively different solubility than at least one of the desired products, so that there is produced a chlorite of one of the selected metals and a chlorate of the other selected metal, and returning the chlorate thus produced to the chlorate-acid decomposition step to constitute at least a portion of the required chlorate content there.

2. A process according to claim 1 in which the reactions are conducted at a temperature not substantially above 70° C.

3. A process according to claim 1 in which the chlorate addition is in amount materially less than is necessary to consume all of the acid so that a high concentration of acid remains.

4. A process according to claim 1 in which the free acid remaining after the chlorate-acid decomposition step is separated from the other products, concentrated, and returned for use as at least a portion of the acid required in said chlorate-acid decomposition step.

5. A process according to claim 1 in which the said third reactant in the chlorate-acid decomposition step is added after the reaction of said chlorate and said acid is substantially completed.

6. A process according to claim 1 in which the said chlorate and said third reactant when a chlorate are added to separate portions of the strong mineral acid thereby producing separate reactions, and thereafter combining the reaction products of the separate reactions.

7. A process according to claim 1 in which both of the compounds reacted with the chlorine dioxide are selected from the class consisting of hydroxides and carbonates, and in which the chlorine dioxide is first substantially completely reacted with one of said compounds, and thereafter the second of said compounds is added to the reaction mixture and is substantially completely reacted with additional chlorine dioxide.

8. A process according to claim 1 in which both of the compounds reacted with the chlorine dioxide are selected from the class consisting of hydroxides and carbonates and in which each of said compounds is separately reacted with different portions of chlorine dioxide, and thereafter the products of such separate reactions are combined.

9. A process according to claim 1 in which the said second-mentioned compound reacted with chlorine dioxide is a soluble salt other than a carbonate, and in which said salt is added to the reaction mixture after the chlorine dioxide has substantially completely reacted with said first-mentioned compound.

10. A process according to claim 1 in which the said second-mentioned compound reacted with chlorine dioxide is a soluble salt other than a carbonate, and in which said salt is at least in part the salt formed from the anion of the mineral acid and one of the selected metals in the preceding chlorate-acid decomposition step.

11. A process for producing a perchlorate of a metal and for producing a chlorite of a different metal, which comprises reacting in a substantially halide-free medium an excess of a strong mineral acid and two different metal chlorates, the metals of the chlorates each being different ones selected from the group consisting of lithium, sodium, potassium, calcium, barium, strontium and magnesium whereby is produced a perchlorate of one of the selected metals, a salt product formed from another of the selected metals and from the anion of the acid employed, and chlorine dioxide, the metal of the perchlorate desired being introduced in about one-third the amount of the total chlorate consumed on an equivalent weight basis, said acid being so selected that the anion thereof does not form an insoluble salt with the metal whose perchlorate is desired, and said chlorates being so selected that substantially no potassium ion is present when a perchlorate other than potassium is desired, reacting the chlorine dioxide thus produced and two compounds selected from the class consisting of hydroxides and carbonates, the metals of said compounds each being different ones selected from the group consisting of lithium, sodium, potassium, calcium, barium, strontium and magnesium, said compounds each being present in about half the amount stoichiometrically required to react with the chlorine dioxide so that there is produced a chlorite of one of the selected metals and the chlorate of the other, and returning said chlorate thus produced to the chlorate-acid decomposition step to constitute at least a portion of the required chlorate content there.

12. A process according to claim 11 in which the metal of the chlorate returned to the chlorate-acid decomposition step is the metal of the perchlorate there formed.

13. A process for producing a perchlorate of a metal and for producing a chlorite of a different metal, which comprises reacting in a substantially halide-free medium an excess of a strong mineral acid and two different metal chlorates, the metals of the chlorates each being different ones selected from the group consisting of lithium, sodium, potassium, calcium, barium, strontium and magnesium whereby is produced a perchlorate of one of the selected metals, a salt product formed from another of the selected metals and from the anion of the acid employed, and chlorine dioxide, the metal of the perchlorate desired being introduced in about one-third the amount of the total chlorate consumed on an equivalent weight basis, said acid being so selected that the anion thereof does not form an insoluble salt with the metal whose perchlorate is desired, and said chlorates being so selected that substantially no potassium ion is present when a perchlorate other than potassium is desired, reacting the chlorine dioxide thus produced, with a compound selected from the class consisting of hydroxides and carbonates, and as a third reactant a soluble salt other than a carbonate, the metals of said compound and said salt each being different ones selected from the group consisting of lithium, sodium, potassium, calcium, barium, strontium and magnesium whereby is formed a chlorate of one of the selected metals and a chlorite of the other, said salt being present in about half the amount of said compound and said chlorine dioxide on a stoichiometrical basis said compound and said salt being so selected that the metal of the former reacts with the anion of the latter to form as a third compound a salt of relatively different solubility than at least one of the major products, and returning the chlorate thus formed to said chlorate-acid decomposition step.

14. A process according to claim 13 in which the metal of the chlorite is the metal of said compound and the metal of the said soluble salt is that of the chlorate formed.

15. A process according to claim 13 in which the metal of the chlorate returned to the chlorate-acid decomposition step is that of the perchlorate there formed.

16. The process for producing potassium perchlorate and a chlorite of a metal selected from the class consisting of lithium, sodium, strontium, calcium, barium and magnesium, which comprises as a first step reacting an excess amount of strong sulfuric acid, potassium chlorate and a different chlorate whose metal is selected from the class consisting of lithium, sodium, strontium, calcium, barium and magnesium so that there is produced potassium perchlorate, a sulfate salt of the selected metal, and chlorine dioxide, the potassium ion being present in approximately half the amount of the other metal ion on a stoichiometrically equivalent basis; as a second step, combining the chlorine dioxide thus produced, and two different compounds each selected from the class consisting of hydroxides and carbonates, the metal of one of said compounds being potassium and the metal of the other being selected from the class consisting of lithium, sodium, strontium, calcium, barium and magnesium so that there is produced potassium chlorate and a chlorite of the metal of said other selected compound, the different compounds being introduced in equal amounts on a stoichiometrically equivalent basis, and returning the potassium chlorate thus produced to said first step to constitute at least a portion of the potassium chlorate there used.

17. A process according to claim 16 in which the reactions are conducted at a temperature not substantially above 70° C.

18. A process according to claim 16 in which the chlorate addition to the chlorate-acid decomposition step is in an amount materially less than is necessary to consume all the acid so that a high concentration of acid remains and in which the unreacted acid is separated from the products of the chlorate-acid decomposition step, concentrated, and returned for reuse.

19. The process for producing potassium perchlorate and a chlorite of a metal selected from the class consisting of lithium, sodium, strontium, calcium, barium and magnesium, which comprises as a first step reacting an excess amount of strong perchloric acid, potassium chlorate and a different chlorate, whose metal is selected from the class consisting of lithium, sodium, strontium, calcium, barium and magnesium so that there is produced potassium perchlorate, a perchlorate salt of the selected metal, and chlorine dioxide, the potassium ion being present in half the amount of the other metal ion on a stoichiometrically equivalent basis, as a second step, combining the chlorine dioxide thus produced, and two different compounds, each selected from the class consisting of hydroxides and carbonates, the metal of one of the selected compounds being potassium and the metal of the other selected compound being selected from the class consisting of lithium, sodium, strontium, calcium, barium and magnesium so that there is produced potassium chlorate and a chlorite of the metal of said other selected compound, the different compounds each being introduced in equal amounts on a stoichiometrically equivalent basis, and returning the potassium chlorate thus produced to said first step to constitute at least a portion of the potassium chlorate there used.

20. A process according to claim 19 in which the reactions are conducted at a temperature not substantially above 70° C.

21. A process according to claim 19 in which the chlorate addition to the chlorate-acid decomposition step is in an amount materially less than is necessary to consume all the acid so that a high concentration of acid remains.

22. A process according to claim 19 in which the chlorate addition to the chlorate-acid decomposition step is in an amount materially less than is necessary to consume all the acid so that a high concentration of acid remains and in which the unreacted acid is separated from the products of the chlorate-acid decomposition step, concentrated, and returned for reuse.

23. A process according to claim 19 in which the said perchlorate salt of the selected metal is treated with a stronger acid to regenerate perchloric acid for reuse in the process.

24. A process according to claim 19 in which the perchlorate salt and excess perchloric acid are separated from the potassium perchlorate, additional perchloric acid is regenerated from the perchlorate salt, and the excess and regenerated perchloric acid is returned to the chlorate-acid decomposition step.

CLIFFORD A. HAMPEL.

REFERENCES CITED

The following references are of record in the file of this patent:

UNITED STATES PATENTS

| Number | Name | Date |
|---|---|---|
| 2,031,681 | Vincent | Feb. 25, 1936 |
| 2,046,830 | Logan | July 7, 1936 |
| 2,092,944 | Vincent | Sept. 14, 1937 |
| 2,169,066 | Cunningham | Aug. 8, 1939 |
| 2,280,938 | Vincent | Apr. 28, 1942 |

OTHER REFERENCES

Mellor, "A Comprehensive Treatise on Inorganic and Theoretical Chemistry," vol. 2, pp. 282, 288, 380, 381, and 395.

Treadwell and Hall, "Analytical Chemistry," vol. 1, p. 423, 7th edition.

Scott, "Standard Methods of Chemical Analysis," vol. 1, p. 412.

Seidell, "Solubilities of Inorganic and Organic Compounds," vol. 1, pp. 513 and 639.